US008974544B2

(12) United States Patent
Hubner et al.

(10) Patent No.: US 8,974,544 B2
(45) Date of Patent: Mar. 10, 2015

(54) METHOD AND SYSTEM FOR PROVIDING REMOTE CONFIGURATION OF MISSING MOBILE DEVICES

(75) Inventors: Paul Hubner, McKinney, TX (US); Steven T. Archer, Dallas, TX (US); Robert A. Clavenna, Lucas, TX (US); Kristopher A. Pate, Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 549 days.

(21) Appl. No.: 12/639,890

(22) Filed: Dec. 16, 2009

(65) Prior Publication Data

US 2011/0145927 A1    Jun. 16, 2011

(51) Int. Cl.

| G06F 11/30 | (2006.01) |
|---|---|
| G08B 13/00 | (2006.01) |
| G08B 21/00 | (2006.01) |
| G08B 29/00 | (2006.01) |
| G06F 21/31 | (2013.01) |
| H04L 29/06 | (2006.01) |
| G06F 21/12 | (2013.01) |
| G06F 21/88 | (2013.01) |
| G06F 17/30 | (2006.01) |
| H04W 8/24 | (2009.01) |

(52) U.S. Cl.
CPC .............. G06F 21/31 (2013.01); H04L 63/10 (2013.01); G06F 21/123 (2013.01); G06F 21/88 (2013.01); G06F 2221/2111 (2013.01); H04W 8/245 (2013.01)
USPC .................. 726/35; 726/26; 726/34; 726/36; 709/224; 709/221

(58) Field of Classification Search
CPC ....... G06F 21/88; G06F 21/123; G06F 21/31; H04L 63/10; H04M 1/66; H04W 12/12
USPC ................... 726/26, 34, 35, 36; 709/221, 224
See application file for complete search history.

(56) References Cited

U.S. PATENT DOCUMENTS

| 5,727,159 | A | * | 3/1998 | Kikinis .......................... 709/246 |
|---|---|---|---|---|
| 5,734,978 | A | * | 3/1998 | Hayatake et al. ............. 455/410 |
| 5,987,609 | A | * | 11/1999 | Hasebe ............................ 726/35 |
| 6,087,937 | A | * | 7/2000 | McCarthy ..................... 340/567 |
| 6,362,736 | B1 | * | 3/2002 | Gehlot ........................ 340/568.1 |
| 6,542,730 | B1 | * | 4/2003 | Hosain .......................... 455/410 |
| 6,643,781 | B1 | * | 11/2003 | Merriam ......................... 726/35 |
| 6,662,023 | B1 | * | 12/2003 | Helle ............................. 455/558 |
| 6,742,027 | B1 | * | 5/2004 | Cromer et al. ................ 709/223 |
| 6,804,699 | B1 | * | 10/2004 | Henrie .......................... 709/203 |
| 6,813,487 | B1 | * | 11/2004 | Trommelen ................ 455/404.1 |
| 6,813,498 | B1 | * | 11/2004 | Durga et al. ................ 455/456.1 |
| 7,054,624 | B2 | * | 5/2006 | Cocita .......................... 455/419 |
| 7,342,483 | B2 | * | 3/2008 | Oesterling et al. ......... 340/426.2 |
| 7,574,235 | B2 | * | 8/2009 | Tu ................................. 455/558 |
| 2003/0065934 | A1 | * | 4/2003 | Angelo et al. ................ 713/200 |
| 2004/0127238 | A1 | * | 7/2004 | Bianconi et al. ............. 455/466 |

(Continued)

Primary Examiner — Michael Simitoski

(57) ABSTRACT

An approach is provided for remotely configuring a mobile device designated as missing. A request to remotely configure the mobile device is received. In response to the request, at least one setting parameter specifying at least one action to be performed by the mobile device is retrieved. A control message specifying the at least one setting parameter is generated. It is determined whether the mobile device is network inaccessible. The control message is queued for transmission over a data channel to the mobile device when the mobile device is determined to be network inaccessible.

19 Claims, 10 Drawing Sheets

(56) References Cited

U.S. PATENT DOCUMENTS

| | | | |
|---|---|---|---|
| 2004/0192303 A1* | 9/2004 | Puthenkulam | 455/435.1 |
| 2004/0254998 A1* | 12/2004 | Horvitz | 709/206 |
| 2004/0267944 A1* | 12/2004 | Britt, Jr. | 709/229 |
| 2005/0044404 A1* | 2/2005 | Bhansali et al. | 713/200 |
| 2005/0085219 A1* | 4/2005 | Noldus | 455/412.1 |
| 2005/0170811 A1* | 8/2005 | Pelaez et al. | 455/410 |
| 2005/0186954 A1* | 8/2005 | Kenney | 455/420 |
| 2005/0255869 A1* | 11/2005 | Byers et al. | 455/466 |
| 2006/0145839 A1* | 7/2006 | Sandage | 340/539.17 |
| 2008/0034224 A1* | 2/2008 | Ferren et al. | 713/193 |
| 2008/0186162 A1* | 8/2008 | Rajan et al. | 340/539.13 |
| 2009/0249497 A1* | 10/2009 | Fitzgerald et al. | 726/35 |
| 2010/0130178 A1* | 5/2010 | Bennett et al. | 455/414.1 |

\* cited by examiner

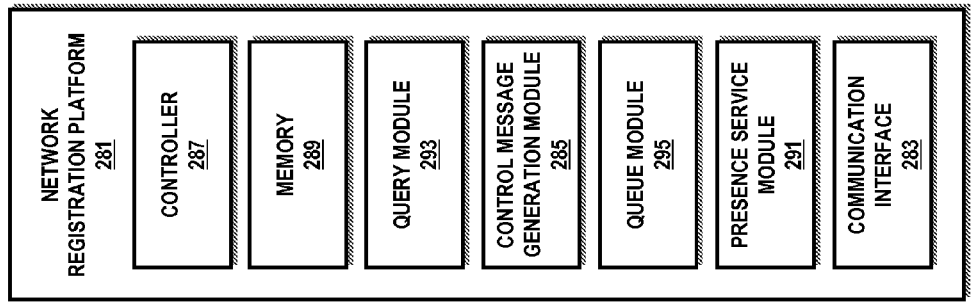
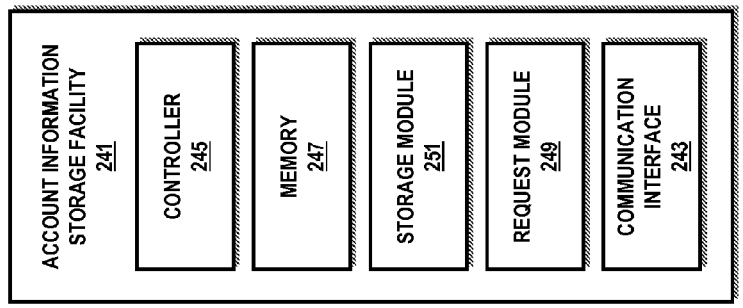
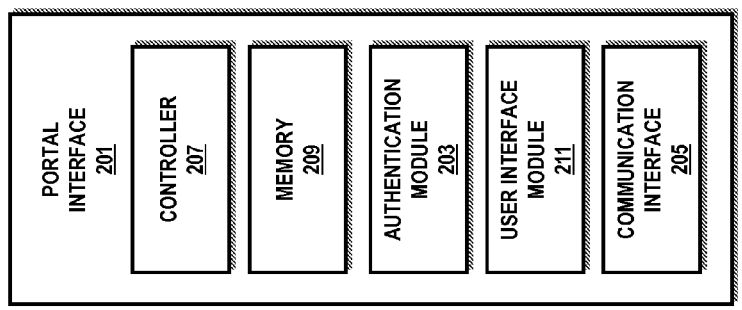

METHOD AND SYSTEM FOR PROVIDING REMOTE CONFIGURATION OF MISSING MOBILE DEVICES

BACKGROUND INFORMATION

Consumer adoption of mobile devices, such as cellular telephones, laptop computers, pagers, personal digital assistants, and the like, is increasing. These devices can be used for a diversity of purposes ranging from basic communications, to conducting business transactions, to managing entertainment media, and a host of other tasks. Additional enhancements, such as location-awareness features, e.g., global positioning system (GPS) tracking, also enable mobile device users to monitor their position and present their location via a local display. As such, mobile devices tend to store an abundant amount of personal or otherwise sensitive information. Unfortunately, the portability and size of these devices often leads to device misplacement, loss, and even theft, all of which translate into an inability to safeguard this personal information. In the event that a user's mobile device does go missing (for whatever the cause), the likelihood of locating and retrieving the missing device is slim to none.

Therefore, there is a need for an approach that can efficiently and effectively provide remote configuration services for missing mobile devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 2A-2C are respective diagrams of a portal interface, an account information storage facility, and a network registration platform that are configured to facilitate remote configuration services for missing mobile devices, according to various exemplary embodiments;

DESCRIPTION OF THE PREFERRED EMBODIMENT

A preferred apparatus, method, and software for providing remote configuration services for missing mobile devices are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to remotely configuring mobile devices, it is contemplated that various exemplary embodiments are also applicable to remotely configuring other devices, entities, facilities, systems, etc.

Figure 1:
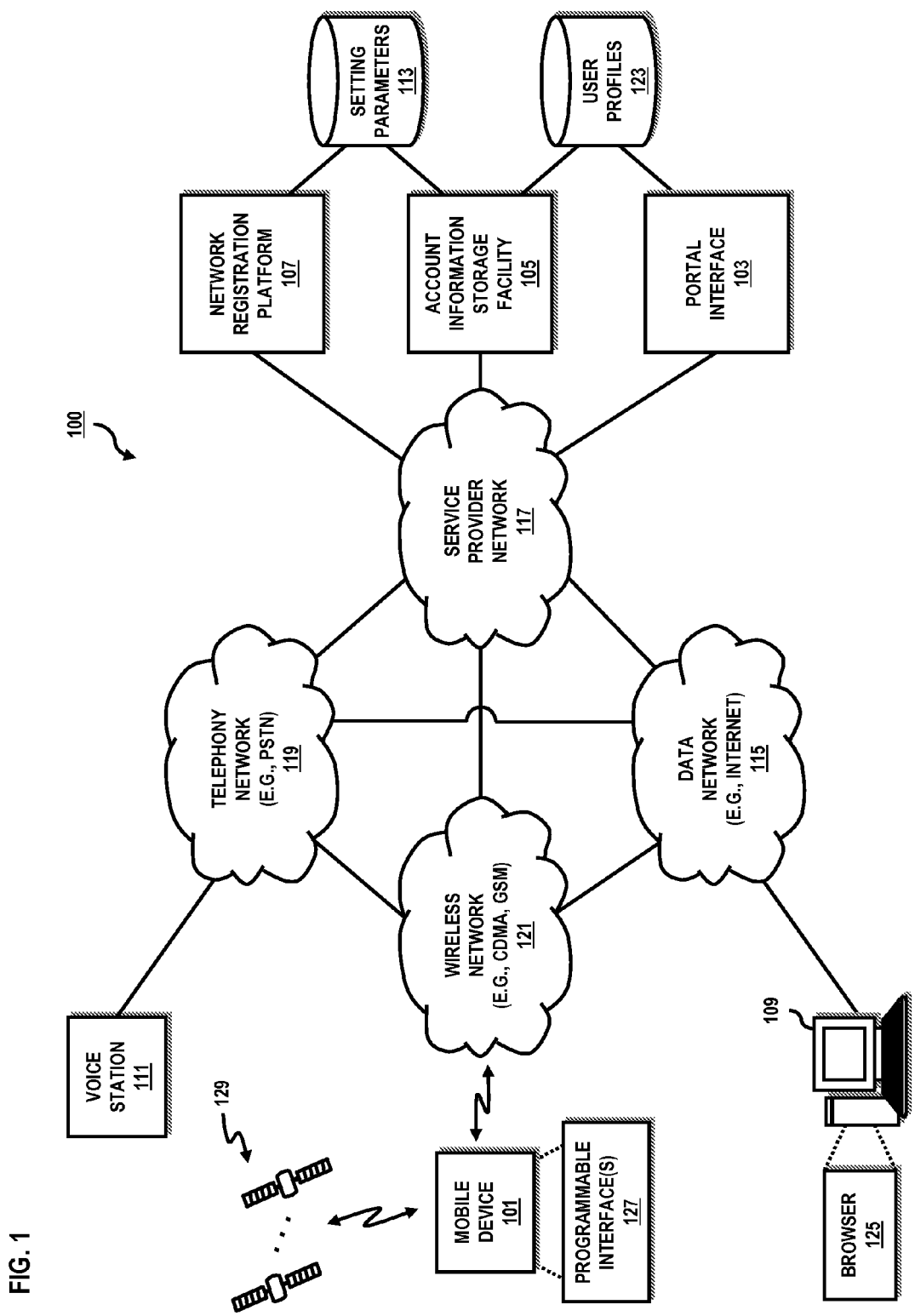
FIG. 1 is a diagram of a system configured to provide remote configuration services for missing mobile devices, according to an exemplary embodiment.

FIG. 1 is a diagram of a system configured to provide remote configuration services for missing mobile devices, according to an exemplary embodiment. For the purposes of illustration, system 100 for remotely configuring one or more mobile devices 101, such as one or more cellular phones, that have been designated as missing is described with respect to portal interface 103, account information storage facility 105, and network registration platform 107. In exemplary embodiments, users at client devices (e.g., computer device 109, voice station 111, or another mobile device (not shown)) may access portal interface 103 to provide indications corresponding to states of their mobile devices 101, such as misplaced, lost, stolen, or recovered, when, for instance, their mobile devices 101 go missing or become found. Based on the provided indications of respective mobile devices 101, portal interface 103 may determine one or more setting parameters for remotely configuring the respective mobile devices 101 and store these one or more setting parameters to a networked repository (e.g., settings parameters repository 113) via account information storage facility 105. It is noted that the one or more setting parameters may specify at least one action to be respectively performed by mobile devices 101 to facilitate, for example, safeguarding information stored to mobile devices 101, as well as preventing unauthorized use of mobile devices 101. Additionally or alternatively, the one or more setting parameters may specify at least one action to be respectively performed by mobile devices 101 to facilitate, for instance, locating and/or retrieving mobile devices 101. In response to storing the one or more setting parameters, account information storage facility 105 may generate requests for remotely configuring mobile devices 101 based on the one or more setting parameters and transmit the generated requests to network registration platform 107. Accordingly, network registration platform 107 may, in response to receiving one or more requests, retrieve corresponding setting parameter(s) for respective mobile devices 101 from setting parameters repository 113 and generate one or more control messages specifying the setting parameter(s) for remotely configuring respective mobile devices 101. It is noted that, in exemplary embodiments, network registration platform 107 may queue transmission of respective control messages to corresponding mobile devices 101 that network registration platform 107 determines to be powered off or otherwise unavailable to receive one or more of the control messages. As such, network registration platform 107 may remotely configure mobile devices 101 over one or more networks, such as one or more data networks 115, service provider networks 117, telephony networks 119, and/or wireless networks 121, via data channels (not shown) of one or more of the network(s), when the mobile devices become available. While specific reference will be made hereto, it is contemplated that system 100 may embody many forms and include multiple and/or alternative components and facilities.

It is observed that portable device users who enjoy an increased level of mobility have to be mindful of their location, as well as keep a vigilant eye on their devices to ensure the devices and/or information stored thereto is not misplaced, lost, or stolen. Traditionally, when a portable device went missing, for whatever the cause, the use of conventional approaches to locate and recover the device has yielded little, if any, success. Moreover, most mobile device owners do not plan for situations when their portable devices go missing. With respect to those owners having the foresight to prepare for such randomly occurring events, it is noted that these owners generally rely on mere password and encryption techniques to protect valuable or otherwise sensitive information stored to their devices; however, even encrypted data, once in the hands of another, may be eventually decrypted. As a consequence, a void exists in the marketplace for effective and efficient techniques to remotely configure mobile devices that have gone missing without the users of these devices having adequately planned for such instances, such as techniques for safeguarding information stored to and preventing unauthorized use of the mobile devices, not to mention techniques for facilitating the process of locating and/or recovering the mobile devices.

Therefore, the approach of system 100, according to certain exemplary embodiments, stems from the recognition that consumers can benefit from remote configuration services for mobile devices that have gone missing without an adequate plan in place, whereby subscribers (or users) of these mobile devices are given access to a portal interface for designating a missing state of their mobile devices and, subsequently, relying on the remote configuration services of system 100 to determine one or more actions to be performed by the missing mobile devices to safeguard information stored to and prevent unauthorized use of the missing mobile devices, as well as to facilitate the process of locating and/or recovering the missing mobile devices. For instance, the one or more actions may "lock" a mobile device to prevent data disclosure, enable one or more communication limitations (e.g., limiting voice and messaging communications to certain designated directory addresses, disabling data communications, etc.) to prevent unauthorized use of the mobile device, image (or backup) a memory of the mobile device to prevent complete loss of information stored to the mobile device, format (or erase) a memory of the mobile device to purge the mobile device of personal or otherwise sensitive information, as well as other similar or suitable actions to safeguard information stored to and prevent unauthorized use of the missing mobile devices. According to certain embodiments, these other suitable actions may include configuring a display screen presentation of the mobile device to ask for help in returning the mobile device to its rightful owner, defining one or more contact addresses for the rightful owner to be reached, configuring one or more audio, visual, and/or tactile alerts to bring attention to the mobile device, "bricking" the mobile device to prevent use of the mobile device and/or account activity, and the like. In this manner, the owners of these mobile devices may rely on the remote configuration services of system 100 to determine at least one setting parameter corresponding to ones of these actions and to generate at least one control message to effectuate the determined actions, as well as queue the control message(s) for transmission to the missing mobile devices when the missing mobile devices are determined to be powered off. As such, the owners can rest assured knowing that, even though they may have been unprepared for the loss of their mobile devices, the devices will be secured as soon as feasibly possible, as well as secured without the user having to perform any arduous or otherwise burdensome task beyond their technical capabilities, such as beyond informing a service provider of the remote configuration services of a "missing" state of their mobile devices. Moreover, a service provider can offer these services without exposing their backend access and control systems to undesirable infiltration, manipulation, data corruption, theft, and/or other security breaches or threats.

Accordingly, exemplary embodiments of system 100 facilitate remote configuration of mobile devices 101 that have gone missing by enabling subscribers (or users) to access portal interface 103 via one or more client devices (e.g., computing device 109, voice station 111, or another mobile device (not shown)) to register to the remote configuration services and to create, customize, and/or manage one or more user profiles stored to, for example, user profiles repository 123 or any other suitable storage location of (or accessible to) the components or facilities of system 100. In this manner, subscribers may via, for example, a browser (or other networking application), such as browser 125, access portal interface 103 over one or more of networks 115-121 to provide an indication corresponding to a state of their mobile device 101, so as to designate their mobile device 101 as "missing." As used herein, the term "missing" is intended to broadly encompass various degrees of mobile devices 101 being within the possession of respective owners (or users), such as being misplaced (e.g., an owner believes mobile device 101 to be generally in their possession, but they are unsure of exactly where the device might be), lost (e.g., an owner is unsure exactly where mobile device 101 is located, but at least knows, believes, or fears it is not in their general possession), stolen (e.g., an owner knows, believes, or at least fears that their mobile device may have been taken by another without authorization), and/or recovered (e.g., an owner has regained actual possession of their mobile device).

In exemplary embodiments, portal interface 103 may, in response to one or more provided missing state indications, be configured to determine one or more setting parameters for remotely configuring mobile devices 101 based on the indications. It is noted that the determination of the one or more setting parameters may be based on a policy of a service provider of the remote configuration services of system 100, such as a policy specifying one or more setting parameters to be effectuated in association with a particular state of mobile device 101. Exemplary associations between particular states of mobile device 101 and one or more setting parameters to be implemented are described in more detail with FIGS. 2A and 5. At any rate, determined setting parameters may be transmitted to account information storage facility 105 for storage to, for example, setting parameters repository 113. According to exemplary embodiments, the setting parameters may be transmitted to account information storage facility 105 in association with an identifier that uniquely identifies the particular mobile devices 101 that are intended to be remotely configured based on the setting parameter(s), such as unique directory addresses, electronic serial numbers, international mobile equipment identifiers, machine access control addresses, mobile directory numbers, mobile equipment identities, mobile identification numbers, internet protocol addresses port address, and/or any other suitable address or identifier. It is noted that portal interface 103 is more fully described with FIG. 2A.

FIG. 2A is a diagram of a portal interface configured to facilitate remote configuration services for missing mobile devices, according to an exemplary embodiment. Portal interface 201 may comprise computing hardware (such as described with respect to FIG. 10), as well as include one or more components configured to execute the processes described herein to facilitate the remote configuration services of system 100. In one implementation, portal interface 201 includes authentication module 203, communication interface 205, controller (or processor) 207, memory 209, and user interface module 211. Portal interface 201 may also communicate with one or more account storage facilities or repositories, such as account storage facility 105 and user profiles repository 123. Users may access portal interface 201 (or the features and functionalities provided thereby) via client devices 101, 109, and 111. While specific reference will be made to this particular implementation, it is also contemplated that portal interface 201 may embody many forms and include multiple and/or alternative components. For example, it is contemplated that the components of portal interface 201 may be combined, located in separate structures, or separate locations.

According to one embodiment, portal interface 201 embodies one or more application servers accessible to client devices 101, 109, and 111 over one or more networks 115-121. Users (or subscribers) can access portal interface 201 to create, customize, and manage one or more user profiles (such as for the purpose of registering mobile devices 101 with the remote configuration services of system 100), as well as for designating one or more of their mobile devices 101 as missing. In certain instances, portal interface 201 may further allow users to customize one or more setting parameters utilized to effectuate the remote configuration services of system 100. As such, portal interface 201 may provide one or more user interfaces, e.g., web portals or other networked applications, to permit users to access the features and functions of portal interface 201 via client devices 101, 109, and 111. According to certain embodiments, user interface module 211 may be configured for exchanging information between client devices 101, 109, and 111 and browser applications (e.g., browser 125) or other network-based applications or systems, such as voice browsers or interactive voice recognition systems.

In exemplary embodiments, portal interface 201 via, for instance, user interface module 211 may be configured to execute one or more graphical user interfaces (GUI) that are configured to provide users with one or more menus of options for creating, customizing, and managing user profiles, as well as engaging with the other features and functions of portal interface 201, such as to provide indications corresponding to states of their mobile devices 101, e.g., to designate ones of their mobile devices 101 as "missing." As such, one or more of these GUIs may be configured to provide users with the ability to uniquely identify (or otherwise specify) which ones of their mobile devices 101 correspond to the specified indications.

According to certain exemplary embodiments, portal interface 201 may be configured to determine one or more setting parameters specifying one or more actions to be performed by missing mobile devices 101 based on received indications corresponding to states of the mobile devices 101. That is, controller 207, in conjunction with one or more instructions (or computer program code) stored to, for example, memory 209, may cause portal interface 201 to determine one or more setting parameters associated with the designated states, such as a designated misplaced state, lost state, stolen state, or recovered state. In one implementation, portal interface 201 may determine one or more setting parameters that, when received by corresponding mobile devices 101, are configuring to cause these devices to present one or more audio, visual, and/or tactile alerts when mobile devices 101 are designated as misplaced.

When, for instance, portal interface 201 receives indications that a mobile device 101 is lost, portal interface 201 may be configured to determine one or more setting parameters that, when received by mobile device 101, cause mobile device 101 to be "locked." Additionally (or alternatively), these one or more setting parameters may, when received by mobile device 101, cause mobile device 101 to present a message asking for help in returning the device to its rightful owner and that by initiating a communication session via the device, e.g., by pressing a "SEND" button of, for instance, a keypad of the device, a reader of the message may initiate communications with the rightful owner. Still further, portal interface 201 may, in response to receiving an indication that mobile device 101 is "lost," determine one or more setting parameters that, when received by mobile device 101, cause mobile device 101 to impose one or more communication limitations, such as limiting voice and/or messaging communication session to certain designated directory addresses, disabling data communications, and the like.

According to various exemplary embodiments, portal interface 201 may also, in response to receiving an indication that a mobile device 101 is "stolen," be configured to determine one or more setting parameters that, when received by mobile device 101, cause mobile device 101 to format a memory of the device and/or to "brick" the device to prevent subsequent use of the device, i.e., cause mobile device 101 to become inoperable. It is noted that the one or more setting parameters may initially cause mobile device 101 to image (or backup) a memory of mobile device 101 and upload the image to, for instance, user profiles repository 123 (or any other suitable storage location accessible to mobile device 101). In certain instances, portal interface 201 may be configured to determine one or more setting parameters that, when received by mobile device 101, cause mobile device 101 to determine and transmit spatial positioning information corresponding to a "current" location the device to, for instance, user profiles repository 123 or any other suitable destination. It is also noted that portal interface 201 may be configured to determine one or more setting parameters that, when received by one or more components of system 100, cause system 100 to terminate providing services to mobile device 101, when mobile device 101 is designated as "misplaced," "lost," or "stolen."

In still further embodiments, when portal interface 201 receives an indication that a mobile device 101 has been "recovered," portal interface 201 may be configured to determine one or more setting parameters that, when received by mobile device 101, cause mobile device 101 to enter (or revert) to a fully functional or otherwise configured state, such as a functional or otherwise configured state of mobile device 101 before mobile device 101 was indicated as being "misplaced," "lost," and/or "stolen." In certain instances, indications that mobile device 101 has been "recovered" may additionally (or alternatively) cause portal interface 201 to determine one or more setting parameters that, when received by one or more components of system 100, cause system 100 to resume providing services to mobile device 101. It is contemplated, however, that additional and/or other setting parameter(s) may be determined by portal interface 201 based on received indications corresponding to a state of mobile device 101, such as the aforementioned "misplaced," "lost," "stolen," and/or "recovered" states.

In those instances when one or more setting parameters require or are capable of user customization, portal interface 201 via, for instance, user interface module 211 may also be configured to provide users with one or more GUI interface elements for inputting such customization information. For instance, portal interface 103 may enable users customize one or more setting parameters to specify the message presented by mobile device 101, select audible, visual, and/or tactile alerts to present, define contact information (e.g., email address, directory address, etc.) for forwarding initiation of communication sessions from mobile device 101 to the user (or owner) of mobile device 101, specify what communication limitations are to be imposed, define alternate contact information for the user (or owner) of mobile device 101 so that initiation of communication sessions with mobile device 101 to the user may be transferred to one or more other client devices (e.g., client devices 109 and 111) associated with the alternatively defined contact information, and the like.

It is also noted that portal interface 201 may be configured to transmit the setting parameter(s) to account information storage facility 105 for storage to, for instance, setting parameters repository 113 and for requesting network registration platform 107 to remotely configure mobile device 101 based on the stored setting parameters. As such, portal interface 201 via, for example, communication interface 205 may transmit the setting parameter(s) to account information storage facility 105 in association with one or more unique identifiers or addressing information corresponding to particular mobile devices 101 designated as missing, such as one or more directory addresses, electronic serial numbers, international mobile equipment identifiers, machine access control addresses, mobile directory numbers, mobile equipment identities, and like. It is also noted that an exemplary process for designating a mobile device as missing is described in more detail in association with FIG. 5, whereas an illustrative GUI is more fully explained with FIG. 6.

In order to provide selective access to the features and functions of portal interface 201, portal interface 201 may also include authentication module 203 for authenticating (or authorizing) users to portal interface 201. It is contemplated that authentication module 203 may operate in concert with communication interface 205 and/or user interface module 211. That is, authentication module 203 may verify user provided credential information acquired via communication interface 205 and/or user interface module 211 against corresponding credential information stored within a user profile of, for instance, user profiles repository 123. By way of example, the credential information may include "log on" information corresponding to a user name, password, coded key, or other unique identification parameter, such a personal identification number (PIN). In other instances, the credential information may include any one or combination of a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., bearer tag identifier, biometric code, voice print, etc. Subscribers may provide this information via client devices 101, 109, and 111, such as by spoken utterances, dual-tone multi-frequency (DTMF) signals, packetized transmission, etc. It is contemplated that unobtrusive security may be provided by positively identifying and screening users based on one or more of the aforementioned credentials which may be seamlessly provided when client devices 101, 109, and 111 communicate with portal interface 201, such as a unique IP or MAC address. Other unobtrusive measures can be made available via voice prints, etc.

Additionally, portal interface 201 may include one or more controllers (or processors) 207 for effectuating the aforementioned features and functions, as well as one or more memories 205 for permanent and/or temporary storage of one or more of the aforementioned variables, parameters, information, signals, messages, identifiers, etc. In this manner, the features and functions of portal interface 201 may be executed by portal interface 201, such as in response to controller(s) 207 (or other components of portal interface 201) executing computer program code (or other instructions) stored to one or more memories 209.

Referring back to FIG. 1, account information storage facility 105 may be configured to receive one or more setting parameters from portal interface 103. According to exemplary embodiments, the setting parameters are received from portal interface 103 in association with, for example, one or more unique identifiers or addressing information corresponding to the particular mobile device 101 to be remotely configured based on the setting parameters. As such, account information storage facility 105 may be configured to store the setting parameter(s) to, for instance, setting parameters repository 113 according to one or more structured models, such as according to a relational database model. For instance, the at least one setting parameter may be stored in association with one or more attributes of mobile device 101, such as in association with the unique identifier or address received from portal interface 103. It is noted that the setting parameters may be stored to any other suitable storage location or memory of (or accessible to) account information storage facility 105. In this manner, the setting parameters may be stored to particular locations that may be uniquely identified based on, for instance, one or more extensible resource identifiers (XRI), internet protocol (IP) addresses, uniform resource identifiers (URI), uniform resource locators (URL), hypertext transfer protocol (HTTP) addresses, or other suitable addresses, identifiers, or locators.

In response to storing the one or more setting parameters, account information storage facility 105 may generate requests for remotely configuring mobile devices 101 based on the one or more stored setting parameters. Alternatively, account information storage facility 105 may generate requests in response to receiving setting parameter(s) from portal interface 103 or any other suitable trigger, such as based on a policy of a service provider of the remote configuration services of system 100. According to exemplary embodiments, the requests may generated to include (or otherwise specify) one or more addresses, identifiers, or locators for retrieving the setting parameter(s) from, for instance, setting parameters repository 113. In this manner, generated requests may be transmitted to network registration platform 107 for generating one or more control messages that, when received by mobile devices 101, are configured to cause mobile devices 101 to be remotely configured, such as remotely configured to performed one or more actions, e.g., one or more of the aforementioned actions. It is noted that account information storage facility 105 is described in more detail in association with FIG. 2B.

FIG. 2B is a diagram of an account information storage facility configured to facilitate remote configuration services for missing mobile devices, according to an exemplary embodiment. Account information storage facility (or facility) 241 may comprise computing hardware (such as described with respect to FIG. 10), as well as include one or more components configured to execute the processes described herein to facilitate the remote configuration services of system 100. In one implementation, facility 241 includes communication interface 243, controller (or processor) 245, memory 247, request module 249, and storage module 251. Facility 241 may also communicate with one or more interfaces, platforms, or repositories, such as portal interface 103, network registration platform 107, setting parameters repository 113, and user profiles repository 123. While specific reference will be made to this particular implementation, it is also contemplated that facility 241 may embody many forms and include multiple and/or alternative components. For example, it is contemplated that the components of facility 241 may be combined, located in separate structures, or separate locations.

According to exemplary embodiments, facility 241 may be configured to receive one or more setting parameters from portal interface 103 via, for example, communication interface 243 over, for instance, service provider network 117. Received setting parameters may be ported to storage module 251 for storage to any suitable storage location or memory of (or accessible to) facility 241, such as setting parameters repository 113, memory 247, etc. As previously mentioned, received setting parameters may be received in association with one or more addresses or identifiers uniquely identifying mobile device(s) 101 to be configured based on the setting parameters and, therefore, may be stored via, for example, storage module 251 in association with the corresponding addresses and/or identifiers of mobile devices 101. Further, storage module 251 may be configured to store the setting parameters in association with a unique XRI, IP address, URI, URL, HTTP address, or other suitable address, identifier, or locator, to uniquely identify a location at which the setting parameters may be retrieved.

In response to storing the one or more setting parameters, request module 249 may be configured to generate requests for remotely configuring mobile devices 101 based on the one or more stored setting parameters and associated mobile device addresses or identifiers. It is noted, however, that request module 249 may generate the request(s) in response to receiving the setting parameter(s) from portal interface 103 or based on any other suitable trigger, such as based on a policy of a service provider of the remote configuration services of system 100. According to exemplary embodiments, the requests may generated by request module 249 to include (or otherwise specify) one or more addresses, identifiers, or locators associated with setting parameters repository 113 that, for example, network registration platform 107 may utilize to retrieve the setting parameter(s). It is noted that an exemplary process for storing setting parameters and requesting remote configuration of a mobile device that has been designated as missing is described in more detail with FIG. 7.

Additionally, facility 241 may include one or more controllers (or processors) 245 for effectuating the aforementioned features and functions of facility 241, as well as one or more memories 247 for permanent and/or temporary storage of one or more of the aforementioned variables, parameters, information, signals, messages, identifiers, addresses, etc. In this manner, the features and functions of facility 241 may be executed by facility 241, such as in response to controller(s) 245 (or other components of facility 241) executing computer program code (or other instructions) stored to one or more memories 247.

Referring back to FIG. 1, network registration platform 107 may be configured to receive requests from account information storage facility 105 over, for instance, service provider network 117 to remotely configure one or more mobile devices 101 based on one or more setting parameters stored to, for instance, setting parameters repository 113. In response to receiving the requests, network registration platform 107 may retrieve corresponding setting parameter(s) for respective mobile devices 101 based on one or more addresses, identifiers, or locators uniquely identifying locations at which the setting parameter(s) may be retrieved. According to exemplary embodiments, network registration platform 107 may generate one or more control messages specifying the corresponding setting parameter(s) for remotely configuring respective mobile devices 101. It is noted that mobile devices 101 may, in exemplary embodiments, include one or more programmable interfaces 127, such as a set of programmable interfaces included within, for example, a binary runtime environment for wireless (BREW) platform, for receiving control messages from network registration platform 107 and, thereby, for being remotely configured, monitored, tracked, etc. Additionally (or alternatively), one or more other programmable interfaces may be utilized, such as one or more programmable interfaces written in accordance with one or more programming languages, such as C, C++, J2ME, Java, etc. As such, control messages generated by network registration platform 107 may be generated for direction to one or more of these programmable interfaces 127.

According to exemplary embodiments, network registration platform 107 may be configured to transmit generated control messages to mobile devices 101 over data channels of one or more of networks 115-121, such as an existing data channel of wireless network 121 conventionally utilized by a service provider of system 100 to distribute software updates to corresponding mobile devices 101. As such, network registration platform 107 may be configured to transmit control messages to mobile devices 101 via any suitable bearer or medium, such as one or more attention (AT) commands, menu traversal paths, function codes, voice data, dual-tone multi-frequency (DTMF) signals, scripts, strings, parameters, object variables, and the like, that are configured to cause mobile devices 101 to perform one or more actions specified by the control messages. It is noted that these control messages may be used in lieu of "software code," and therefore, may be directly integrated into the control logic of mobile devices 101. In this manner, execution of certain ones of these control messages may require less processing than execution of conventional coded instructions. It is contemplated, however, that such conventional coded instructions may also be utilized. As such, these control messages may be utilized by programmable interfaces 127 to facilitate the remote configuration services of system 100.

As previously mentioned, mobile devices 101 often go missing when the devices are configured in one or more unavailable states, such as in a powered off state. In other instances, mobile devices 101 may enter an unavailable state when, for instance, service signal strength to mobile devices 101 diminish below acceptable levels or the devices enter one or more locations unfavorable to receiving control messages. As such, network registration platform 107 may be configured to queue transmission of respective control messages to corresponding mobile devices 101 that network registration platform 107 determines to be powered off or otherwise unavailable to receive control messages. Thus, when these corresponding mobile devices 101 become available, network registration platform 107 may remote the control messages from the queue(s) and, thereby, transmit the respective control messages to mobile devices 101 when they become available to receive control messages. It is noted that network registration platform 107 is described in more detail with FIG. 2C.

FIG. 2C is a diagram of a network registration platform configured to facilitate remote configuration services for missing mobile devices, according to an exemplary embodiment. Network registration platform (or platform) 281 may comprise computing hardware (such as described with respect to FIG. 10), as well as include one or more components configured to execute the processes described herein to facilitate the remote configuration services of system 100. In one implementation, platform 281 includes communication interface 283, control message generation module 285, controller (or processor) 287, memory 289, presence service module 291, query module 293, and queue module 295. Platform 281 may also communicate with one or more facilities or repositories, such as account information storage facility 105 and setting parameters repository 113. Furthermore, platform 281 is also configured to transmit control messages to missing mobile devices, such as mobile devices 101. While specific reference will be made to this particular implementation, it is contemplated that platform 281 may embody many forms and include multiple and/or alternative components. For example, it is contemplated that the components of platform 281 may be combined, located in separate structures, or separate locations.

According to exemplary embodiments, platform 281 may be configured to receive via, for example, communication interface 283, one or more requests from account information storage facility 105 over, for instance, service provider network 117 to remotely configure one or more mobile devices 101 based on one or more setting parameters stored to, for instance, setting parameters repository 113. It is noted that the setting parameter(s) may specify at least one action to be performed by respective mobile devices 101 that have been designated as missing. In certain embodiments, requests to remotely configure mobile devices 101 designated as missing may additionally include (or otherwise specify) one or more unique XRIs, IP addresses, URIs, URLs, HTTP addresses, or other suitable addresses, identifiers, or locators, to uniquely identify one or more location at which the setting parameter(s) may be retrieved. As such, communication interface 283 may be configured to port received requests to query module 293 for extraction of the addresses, identifiers, locators, etc., and, thereby, to retrieve corresponding setting parameter(s) from, for instance, setting parameters repository 113 at the specified addresses, identifiers, locators, etc. In addition to retrieving the setting parameters, query module 293 may also be configured to retrieve one or more mobile device addresses or identifiers corresponding to the requests, such as one or more directory addresses, electronic serial numbers, international mobile equipment identifiers, machine access control addresses, mobile directory numbers, mobile equipment identities, mobile identification numbers, internet protocol addresses, port addresses, and/or the like. It is noted that, in alternative embodiments, these addresses or identifiers may be additionally (or alternatively) specified by the received requests. As such, the addresses or identifiers may be parsed from the requests.

In exemplary embodiments, query module 293 may port the setting parameter(s) and mobile device address(es)/identifier(s) to control message generation module 285 for generation of one or more control messages specifying the corresponding setting parameter(s) for remotely configuring mobile devices 101 corresponding to the mobile device address(es)/identifier(s). It is noted that the generation of control messages by control message generation module 285 may be performed so as to direct the control messages to one or more programmable interfaces 127 of mobile devices 101, such as a set of programmable interfaces included within, for example, a BREW platform configured for receiving control messages. Additionally (or alternatively), the control message(s) may be generated for direction to one or more other programmable interfaces 127 of mobile device 101, such as one or more programmable interfaces written in accordance with one or more programming languages, such as C, C++, J2ME, Java, etc. In this manner, generated control messages may be transmitted to mobile devices 101 designated missing via, for example, communication interface 283. Transmission of control messages may occur over, for example, a data channel of one or more of networks 115-117, such as an existing access and control data channel of wireless network 121 conventionally utilized by a service provider of system 100 to distribute software updates to corresponding mobile devices 101.

Platform 281 may also include presence service module 291 for determining one or more conditions affecting the ability (or availability) of mobile devices 101 to receive one or more generated control messages. That is, presence service module 291 may be configured to determine presence information related to, for example, whether or not mobile devices 101 are network accessible (e.g., powered on) or network inaccessible (e.g., powered off). Additionally (or alternatively), presence service module 291 may be configured to determine other presence information, such as mobile device signal strength, spatial positioning information, and the like. It is noted that these forms of presence information may be received from corresponding mobile devices 101 and, thereby, tracked via presence service module 291 or presence service module 291 may "poll" mobile devices 101 for the presence information. An exemplary model for presence determination is detailed in Internet Engineering Task Force (IETF) Request for Comment (RFC) 2778, which is incorporated herein by reference in its entirety. According to certain embodiments, the presence or availability of mobile devices 101 may be utilized to determine whether control messages may be transmitted to mobile devices 101.

It is noted that, in those instances when mobile devices 101 are not "present" to receive generated control messages, platform 281 may queue the control messages via queue module 295. For instance, a particular mobile device 101 may be powered off, spatially positioned in a location unsuitable to receiving control messages, or unable to receive sufficient signal strength. As such, platform 281 may queue control messages for the particular mobile device 101 in one or more queues (not shown) of queue module 295. It is noted that queued control messages may be queued for transmission until the particular mobile devices 101 are determined by, for instance, presence service module 291 to be available, e.g., powered on, suitably positioned, and receiving sufficient signal strength. In this manner, queued control messages may be removed from a corresponding queue of queue module 295 and transmitted to corresponding mobile devices 101 when the mobile devices 101 become available. It is noted that queued control messages may also be removed from a queue after a predetermined time period based on a policy of a service provider of the remote configuration services of system 100, so as to prevent queues of queue module 295 from being inundated with control messages that may never be transmitted. An exemplary process for transmitting a control message to a mobile device designated missing, is described in more detail with FIG. 8.

Additionally, platform 281 may include one or more controllers (or processors) 287 for effectuating the aforementioned features and functions of platform 281, as well as one or more memories 289 for permanent and/or temporary storage of one or more of the aforementioned variables, parameters, information, signals, messages, identifiers, addresses, locators, etc. In this manner, the features and functions of platform 281 may be executed by platform 281, such as in response to controller(s) 287 (or other components of platform 281) executing computer program code (or other instructions) stored to one or more memories 289.

As seen in FIG. 1, service provider network 117 enables client devices 101, 109, and 111 to access the features and functions of portal interface 103 via one or more of networks 115, 119, and 121. Networks 115-121 may be any suitable wireline and/or wireless network. For example, telephony network 119 may include a circuit-switched network, such as the public switched telephone network (PSTN), an integrated services digital network (ISDN), a private branch exchange (PBX), or other like network. Wireless network 121 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 115 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 115-121 may be completely or partially contained within one another, or may embody one or more of the aforementioned infrastructures. For instance, service provider network 117 may embody circuit-switched and/or packet-switched networks that include facilities to provide for transport of circuit-switched and/or packet-based communications. It is further contemplated that networks 115-121 may include components and facilities to provide for signaling and/or bearer communications between the various components or facilities of system 100. In this manner, networks 115-121 may embody or include portions of a signaling system 7 (SS7) network, or other suitable infrastructure to support control and signaling functions. As such, the conjunction of networks 115-121 may be adapted to facilitate the remote configuration services of system 100.

It is noted that system 100 may also include satellite positioning system (SPS) technology, such as GPS technology; however, any other suitable navigational or location determination technology may be utilized, such as advanced forward link trilateration (A-FLT), assisted-GPS (A-GPS), enhanced cellular identification (CELL-ID), wireless area network (WLAN) positioning, etc. According to exemplary embodiments, the SPS technology of system 100 may be configured to utilize a constellation 129 of satellites that transmit signals to receivers (not shown) of, for example, one or more mobile devices 101, so that the receivers may determine corresponding spatial positioning information (or locations), speeds, directions, and/or timing for mobile devices 101. As such, mobile devices 101 may be configured to report this spatial positioning information to, for instance, presence service module 291 to facilitate presence determinations and/or carrying out one or more actions specified by a control message.

According to exemplary embodiments, client devices 101, 109, and 111 may include any customer premise equipment (CPE) capable of sending and/or receiving information over one or more of networks 115-121. For instance, voice terminal 111 may be any suitable plain old telephone service (POTS) device, facsimile machine, etc., whereas mobile terminal 101 may be any cellular phone, radiophone, satellite phone, smart phone, wireless phone, or any other suitable mobile device, such as a personal digital assistant (PDA), pocket personal computer, tablet, customized hardware, etc. Further, computing device 109 may be any suitable computing device, such as a VoIP phone, skinny client control protocol (SCCP) phone, session initiation protocol (SIP) phone, IP phone, personal computer, softphone, workstation, terminal, server, etc. Even though only a limited number of user devices 101, 109, and 111 are illustrated, it is contemplated that system 100 can support a plurality of user devices 101, 109, and 111.

As previously mentioned, system 100 includes user profiles repository 123 for storing subscriber information, such as billing information, contact information, demographic information, location information, mobile device configurations, subscription parameters, and the like. User profiles repository 123 may also be utilized to store data relating to authorized users of the remote configuration services of system 100, as well as associated authorization information corresponding to the users. Setting parameters repository 113 may be configured to store one or more setting parameters specifying actions to be performed by mobile devices 101 that have been designated as missing. These setting parameters may relate to any suitably configurable aspect of mobile devices 101 to cause mobile devices 101 to safeguard information stored to and prevent unauthorized use of mobile devices 101, as well as to facilitate the process of locating and/or recovering mobile devices 101.

According to exemplary embodiments, repositories 113 and 123 may be maintained by a service provider of the remote configuration services of system 100 or may be maintained by any suitable third-party. It is contemplated that the physical implementation of repositories 113 and 123 may take on many forms, including, for example, portions of existing repositories of a service provider, new repositories of a service provider, third-party repositories, and/or shared-repositories. As such, repositories 113 and 123 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when repositories 113 and 123 are provided in distributed fashions, information and content available via repositories 113 and 123 may be located utilizing any suitable querying technique, such as electronic number matching, distributed universal number discovery (DUNDi), uniform resource identifiers (URI), etc.

Figure 3:
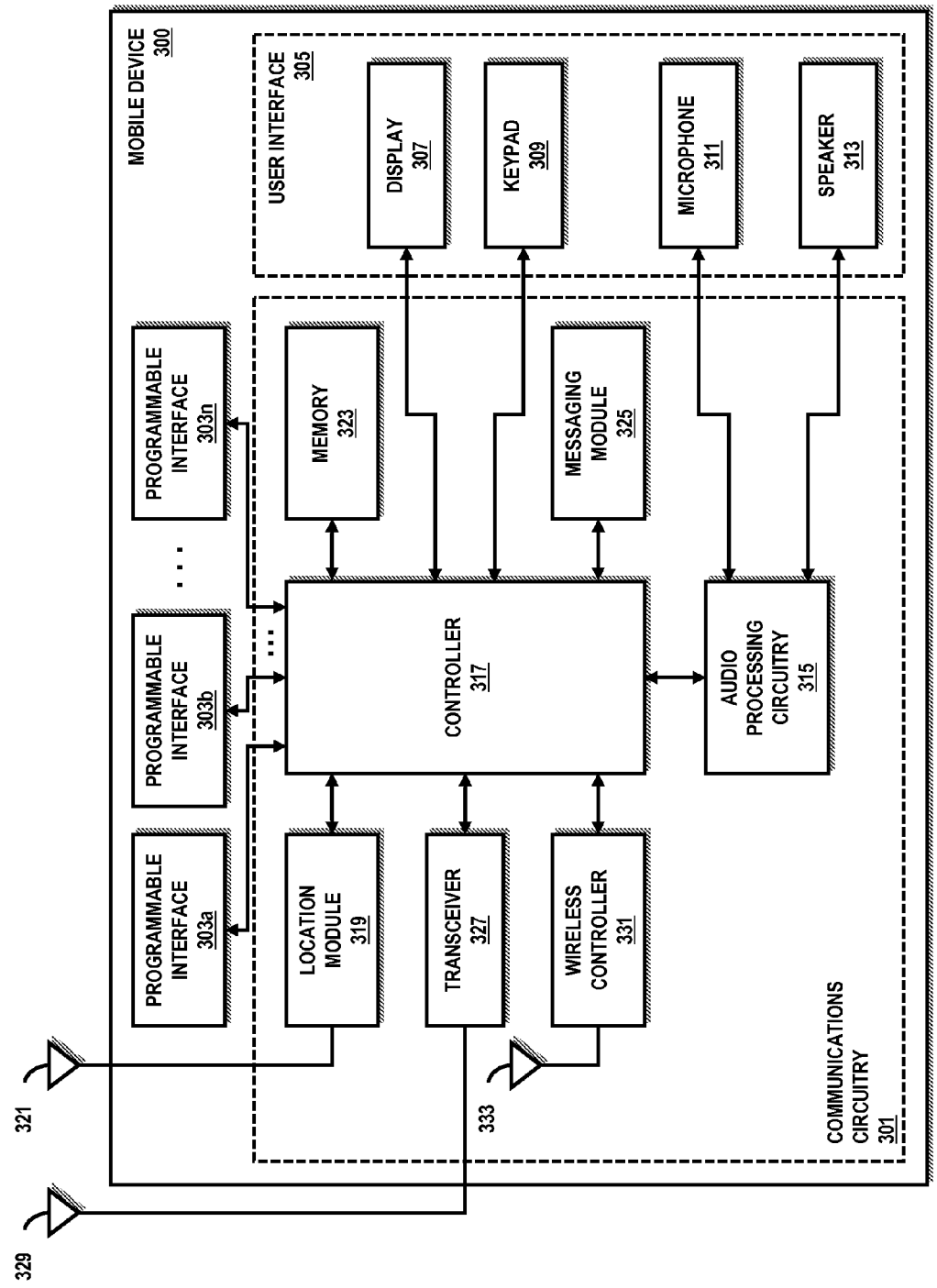
FIG. 3 is a diagram of a mobile device configured to facilitate remote configuration services for missing mobile devices, according to an exemplary embodiment.

FIG. 3 is a diagram of a mobile device configured to facilitate remote configuration services for missing mobile devices, according to an exemplary embodiment. Mobile device 300 may comprise computing hardware (such as described with respect to FIG. 10), as well as include one or more components configured to execute the processes described herein for facilitating the remote configuration services of system 100. In this example, mobile device 300 includes communications circuitry 301, programming interfaces 303a-303n, and user interface 305. While specific reference will be made hereto, it is contemplated that mobile device 300 may embody many forms and include multiple and/or alternative components.

According to exemplary embodiments, user interface 305 may include one or more displays 307, keypads 309, microphones 311, and/or speakers 313. Display 307 provides a graphical user interface (GUI) that permits a user of mobile device 300 to view dialed digits, call status, menu options, and other service information. The GUI may include icons and menus, as well as other text and symbols. Keypad 309 includes an alphanumeric keypad and may represent other input controls, such as one or more button controls, dials, joysticks, touch panels, etc. As such, a user may utilize one or more components of user interface 305 to construct user profiles, enter commands, initialize applications, input remote addresses, select options from menu systems, and the like. In this manner, it is noted that microphone 311 coverts spoken utterances of a user (or other auditory sounds, e.g., environmental sounds) into electronic audio signals, whereas speaker 313 converts audio signals into audible sounds.

Communications circuitry 301 may include audio processing circuitry 315, controller 317, location module 319 (such as a GPS receiver) coupled to antenna 321, memory 323, messaging module 325, transceiver 327 coupled to antenna 329, and wireless controller 331 coupled to antenna 333. Memory 323 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 323 may be implemented as one or more discrete devices, stacked devices, or integrated with controller 317. Memory 323 may store information, such as one or more user profiles, one or more user defined policies, one or more contact lists, personal information, sensitive information, work related information, configurable setting parameters, and the like.

Even though not illustrated, it is contemplated that mobile device 300 may also include one or more applications and, thereby, may store (via memory 323) data (and/or setting parameters) associated with these applications for providing users with browsing functions, business functions, calendar functions, communication functions, contact managing functions, data editing (e.g., database, word processing, spreadsheets, etc.) functions, financial functions, gaming functions, imaging functions, location determination functions, messaging (e.g., electronic mail, instant messaging, enhanced messaging, multimedia messaging, short messaging, etc.) functions, multimedia functions, service functions, storage functions, synchronization functions, task managing functions, querying functions, and the like. As such, control messages received by mobile device 300 from, for example, network registration platform 107 may be utilized by one or more of programmable interfaces 303a-303n and/or controller 317 to facilitate remote configuration, modification, and/or utilization of one or more features, options, settings, etc., of these applications. It is also contemplated that these (or other) control messages may be utilized by controller 317 to facilitate remotely backing up and/or erasing data associated with these applications. In other instances, the control messages may cause mobile device 300 to become completely or partially deactivated or otherwise inoperable.

Accordingly, controller 317 may be configured to control the operation of mobile device 300, such as in response to commands received from programmable interfaces 303a-303n and/or data stored to memory 323. Control functions may be implemented in a single controller or via multiple controllers. Suitable controllers 317 may include, for example, both general purpose and special purpose controllers and digital signal processors. Controller 317 may interface with audio processing circuitry 315, which provides basic analog output signals to speaker 313 and receives analog audio inputs from microphone 311. In exemplary embodiments, controller 317 may be controlled by programmable interfaces 303a-303n in order to "lock" access to memory 323 and, thereby, prevent data disclosure therefrom, enable one or more communication limitations (e.g., limiting voice and messaging communications via messaging module 325 and transceiver 327 to certain designated directory addresses, disabling data communication functions of controller 317, etc.) to prevent unauthorized use of mobile device 300, image (or backup) memory 323 to prevent complete loss of information stored to memory 323, format (or erase) memory 323 to purge mobile device 300 of personal or otherwise sensitive information, as well as perform other similar or suitable actions to safeguard information stored to and prevent unauthorized use of mobile device 300. For example, other suitable actions may include configuring presentations of display 307 to ask for help in returning mobile device 300 to its rightful owner, defining one or more contact addresses within memory 323 for the rightful owner to be reached, configuring one or more audio, visual, and/or tactile alerts to be presented via display 307, speaker 313, and/or other user interface components of mobile device 300 so as to bring attention to mobile device 300, "bricking" mobile device 300 to prevent subsequent use of mobile device 300, causing location module 319 to determine spatial positioning information corresponding to a location of mobile device 300, and the like. It is noted that, in certain embodiments, the control messages may be utilized to transmit spatial positioning information, memory images, etc., to one or more destinations via transceiver 327 and/or wireless controller 331. In this manner, controller 317 and/or one or more of programmable interfaces 303a-303n may be remotely configured and/or controlled via received control messages that cause mobile device 300 to perform one or more specified actions.

It is noted that real time spatial positioning information may be obtained or determined via location module 319 using, for instance, satellite positioning system technology, such as GPS technology. In this way, location module 319 can behave as (or substantially similar to) a GPS receiver. Thus, mobile device 300 employs location module 319 to communicate with constellation 129 of satellites. These satellites 129 transmit very low power interference and jamming resistant signals received by GPS receivers 319 via, for example, antennas 321. At any point on Earth, GPS receiver 319 can receive signals from multiple satellites, such as six to eleven. Specifically, GPS receiver 319 may determine three-dimensional geolocation (or spatial positioning information) from signals obtained from at least four satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites 129. Thus, if mobile device 300 is able to identify signals from at least four satellites 129, receivers 319 may decode the ephemeris and clock data, determine the pseudo range for each satellite 129 and, thereby, compute the spatial positioning of a receiving antenna 321. With GPS technology, mobile device 300 can determine its spatial position with great accuracy and convenience. It is contemplated, however, that location module 319 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multipath analysis, and the like.

Mobile device 300 also includes messaging module 325 that is configured to receive, transmit, and/or process messages (e.g., EMS messages, SMS messages, MMS messages, IM messages, electronic mail messages, and/or any other suitable message) received from (or transmitted to) any suitable component or facility of system 100, as well as from (or to) one or more other mobile devices (not shown) or destinations. As previously mentioned, network registration platform 107 may transmit control messages to mobile device 300 in the form of one or more programmable interface directed messages, e.g., one or more BREW directed control messages. As such, messaging module 325 and/or controller 317 may be configured to identify such control messages, as well as activate and/or configure one or more of programmable interfaces 303a-303n, in response thereto. Furthermore, messaging module 325 may be further configured to parse setting parameters from these control messages and, thereby, port parsed setting parameters to corresponding components of mobile device 300, such as programmable interfaces 303a-303n, controller 317, location module 319, memory 323, transceiver 327, wireless controller 331, display 307, speaker 313, etc., for implementation. Accordingly, programmable interfaces 303a-303n (once activated) may be configured to effectuate one or more actions specified by received setting parameters, such as for remotely controlling, configuring, monitoring, tracking, etc., mobile device 300.

It is also noted that mobile device 300 can be equipped with wireless controller 331 to communicate with a wireless headset (not shown) or other wireless network. The headset can employ any number of standard radio technologies to communicate with wireless controller 331; for example, the headset can be BLUETOOTH enabled. It is contemplated that other equivalent short range radio technology and protocols can be utilized.

Figure 4:
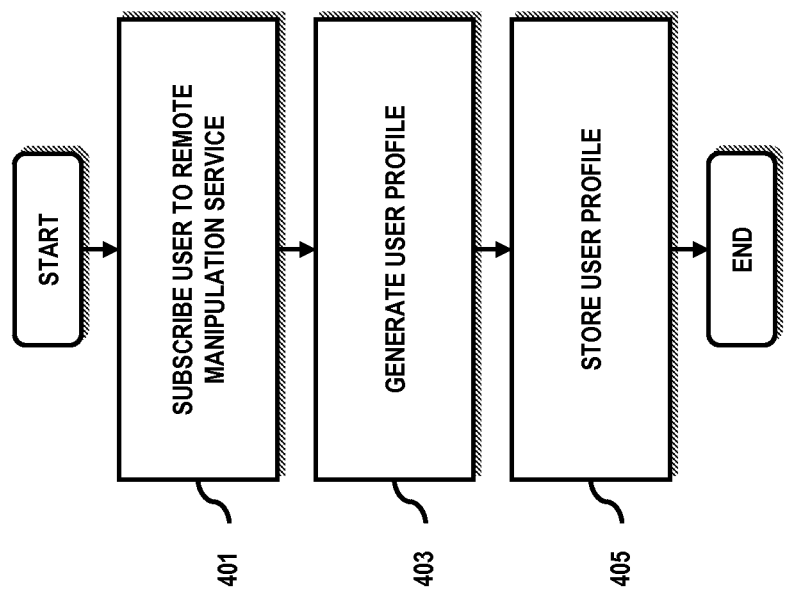
FIG. 4 is a flowchart of a process for subscribing a user to remote configuration services for missing mobile devices, according to an exemplary embodiment.

FIG. 4 is a flowchart of a process for subscribing a user to remote configuration services, according to an exemplary embodiment. For illustrative purposes, the process is described with respect to FIGS. 1 and 2. It is noted that the steps of the process may be performed in any suitable order, as well as combined or separated in any suitable manner. At step 401, portal interface 201 subscribes a user associated with one or more mobile devices (e.g., mobile device 101) to the remote configuration services of system 100. According to one embodiment, the user may subscribe utilizing any suitable client device capable of processing and transmitting information over one or more of networks 115-121, such as computing device 109. Namely, the user may interact with an input interface (e.g., a keyboard, interactive voice response (IVR) interface, etc.) of, for example, computing device 109 to activate software resident on device 109, such as a GUI or other networked application, that interfaces with (or is implemented by) portal interface 201. Alternatively, the user may interact with a voice portal (not shown) interfacing with (or implemented by) portal interface 201, wherein speech synthesis and voice recognition techniques are utilized to prompt the user for various information and to reduce spoken utterances of the user and/or other signals (e.g., dual tone multi-frequency signals) associated with the user to one or more corresponding inputs. As such, the user can register as a new subscriber to the remote configuration services and may obtain sufficient authentication information for establishing future sessions with portal interface 201.

According to certain embodiments, registration procedures may prompt the user to identify mobile devices 101 and/or other client devices, e.g., client devices 109 and 111, that the user may wish to remotely configure when, for instance, such devices become misplaced, lost, stolen, and/or recovered, as well as those client devices 109, 111, and/or other mobile devices (not shown) that the user may utilize to access the features and functions of the remote configuration services of system 100. In this manner, the user may uniquely identify these devices 101, 109, and 111 by entering appropriate device information (or identifiers), such as one or more device types, serial numbers, registration numbers, MAC addresses, directory addresses, communications links, etc., corresponding to devices 101, 109, and 111. In certain exemplary embodiments, portal interface 201 may obtain corresponding configuration and/or interfacing information relating to these devices from, for example, one or more manufacturers or other third-party suppliers over, for instance, data network 115. It is noted that this configuration and/or interfacing information may be utilized by portal interface 201 and/or network registration platform 107 to facilitate the remote configuration services of system 100. Furthermore, the configuration and/or interfacing information may be stored to any suitable storage location or memory of (or accessible to) system 100, such as repositories 113 and 123.

Once registered (or as part of the registration process), portal interface 201 enables the user, per step 403, to generate and/or customize a user profile. The user profile may include addressing information (e.g., directory number, electronic serial number, international mobile equipment identifier, machine access control address, mobile directory number, mobile equipment identity, mobile identification number, internet protocol address, port address, and/or any other suitable address) corresponding to identified client devices 101, 109, and 111 that the user desires to register with the remote configuration services of system 100, as well as include other personal and/or service related information, parameters, polices, variables, etc., such as configuration and/or interfacing information, and the like. At step 405, portal interface 201 stores the user to a list of subscribers to the remote configuration services of system 100, as well as stores the generated user profile, authentication information, device identifiers, etc., to, for example, user profiles repository 123. It is noted that portal interface 201 may additionally (or alternatively) store or synchronize this user profile information to any suitable storage location or memory of (or accessible to) portal interface 201. According to other embodiments, portal interface 201 may provide this information to account storage facility 105 for storage to, for example, user profiles repository 123 or any other suitable storage location or memory of (or accessible to) portal interface 201. Further, it is contemplated that users may directly interact with profiles repository 123.

Figure 5:
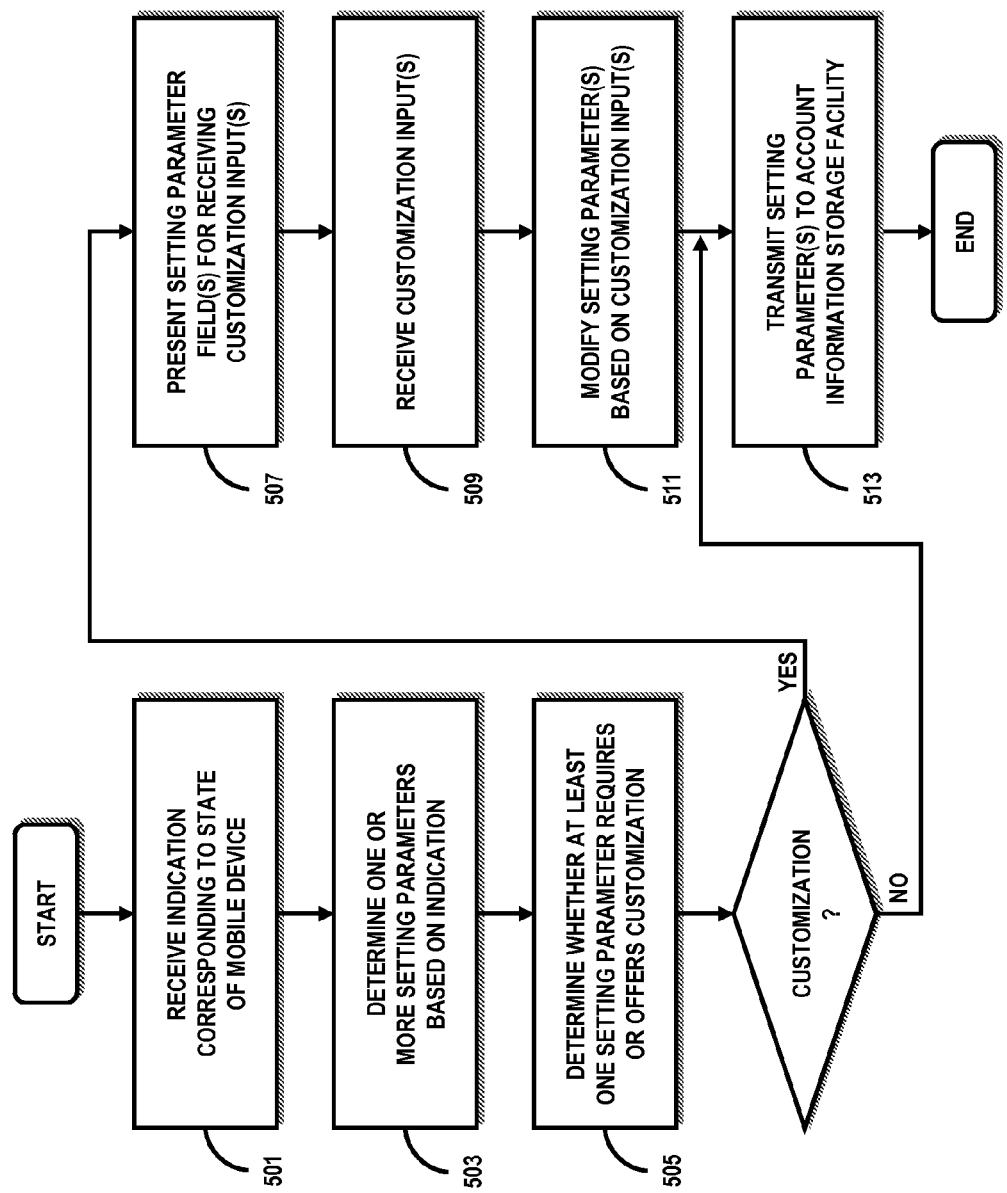
FIG. 5 is a flowchart of a process for designating a mobile device as missing, according to an exemplary embodiment.

FIG. 5 is a flowchart of a process for designating a mobile device as missing, according to an exemplary embodiment. For illustrative purposes, the process is described with respect to FIGS. 1 and 2. It is noted that the process involves, for example, mobile device 101 having gone missing (or alternatively, having been found), such as mobile device 101 having been misplaced, lost, stolen, or recovered. It is also assumed that a user (or owner) associated with mobile device 101 has subscribed to the remote configuration services of system 100. Still further, it is noted that the steps of the process may be performed in any suitable order, as well as combined or separated in any suitable manner. At step 501, portal interface 201 receives via, for example, communication interface 205, an indication corresponding to a state of mobile device 101, such as a missing state of mobile device 101. That is, a subscriber via, for example, computing device 109 establishes a communication session with portal interface 201, such as by "logging on" to a networked user interface provided by, for instance, user interface module 211 and, thereby, accessed via browser 125. It is noted that before gaining access, the subscriber may be required to provide credential information, such as a username and password combination for authentication (or authorization) purposes, which may be effectuated via authentication module 203. Once "logged on," user interface module 211 may present the user with one or more GUIs, menus, options, selections, etc., enabling the subscriber to provide the indication, as well as to uniquely identify (or otherwise specify) the mobile device 101 to which the indication applies. It is noted that an exemplary user interface for designating a mobile device as missing is described in more detail with FIG. 6.

In step 503, portal interface 201 determines one or more setting parameters specifying one or more actions to be performed by mobile device 101 based on the received indication. That is, controller 207, in conjunction with one or more instructions (or computer program code) stored to memory 209, may cause portal interface 201 to determine one or more setting parameters associated with the designated missing state. In exemplary embodiments, indicating that mobile device 101 is "misplaced" may cause portal interface 201 to determine one or more setting parameters that, when received by mobile device 101, are configuring to cause mobile device 101 to present one or more audio, visual, and/or tactile alerts, such as to bring attention to mobile device 101. Indicating that mobile device 101 is "lost" may cause portal interface 103 to determine one or more setting parameters that, when received by mobile device 101, cause mobile device 101 to be "locked" and, thereby, prevent data disclosure and to configure a presentation of a display of mobile device 101 to present a message asking for help in returning the device to its rightful owner and that by initiating a communication session, e.g., by pressing a "SEND" button of, for instance, a keypad of mobile device 101, a reader of the message may initiate communications with the rightful owner. Additionally (or alternatively), indicating that mobile device 101 is "lost" may cause portal interface 201 to determine one or more setting parameters that, when received by mobile device 101, cause mobile device 101 to impose one or more communication limitations, such as limiting voice and/or messaging communication sessions to certain designated directory addresses, disabling data communications, and the like, so as to prevent unauthorized use of the mobile device.

Still further, indicating that mobile device 101 is "stolen" may cause portal interface 201 to determine one or more setting parameters that, when received by mobile device 101, cause mobile device 101 to format a memory of mobile device 101 so as to purge mobile device 101 of personal or otherwise sensitive information and/or to "brick" mobile device 101 so as to prevent subsequent use of the device 101, i.e., cause mobile device 101 to become inoperable. It is noted that the one or more setting parameters may initially cause mobile device 101 to image (or backup) a memory of mobile device 101 and upload the image to, for instance, user profiles repository 123 (or any other suitable storage location accessible to mobile device 101), so as to prevent complete loss of the information stored to the memory before the memory is formatted. Indicating that mobile device 101 is "stolen" may cause portal interface 201 to additionally (or alternatively) determine one or more setting parameters that, when received by mobile device 101, cause mobile device 101 to determine and transmit spatial positioning information corresponding to a "current" location of the device to, for instance, user profiles repository 123 or any other suitable destination. For instance, the spatial positioning information may be transmitted to another device associated with the user, such as computing device 109, voice station 111, or another mobile device (not shown). Still further, the spatial positioning information may be conveyed by mobile device 101 to the user via electronic mail, short messaging service message, enhanced messaging service message, multimedia messaging service message, facsimile, page, voice call, etc. It is also noted that indicating mobile device 101 as being "misplaced," "lost," and/or "stolen," may cause portal interface 201 to determine one or more setting parameters that, when received by one or more components of system 100, cause system 100 to terminate providing services to mobile device 101.

According to other exemplary embodiments, indicating that mobile device 101 has been "recovered" may cause portal interface 201 to determine one or more setting parameters that, when received by mobile device 101, cause mobile device 101 to enter (or revert) to a fully functional or otherwise configured state, such as a functional or otherwise configured state of mobile device 101 before mobile device 101 was indicated as being "misplaced," "lost," and/or "stolen." In certain instances, indicating that mobile device 101 has been "recovered" may additionally (or alternatively) cause portal interface 201 to determine one or more setting parameters that, when received by one or more components of system 100, cause system 100 to resume providing services to mobile device 101. It is contemplated, however, that additional and/or other setting parameter(s) may be determined by portal interface 201 based on the received indication corresponding to a state of mobile device 101, such as the aforementioned "misplaced," "lost," "stolen," and/or "recovered" states.

It is noted that one or more of the aforementioned setting parameters may require or provide for one or more optional inputs or customizations. For instance, portal interface 201 may enable the user to customize the one or more setting parameters to specify the message presented by mobile device 101, select audible, visual, and/or tactile alerts, define contact information (e.g., email address, directory address, etc.) for forwarding initiation of communication sessions from mobile device 101 to the user (or owner) of mobile device 101, specify what communication limitations are to be imposed, define alternate contact information for the user (or owner) of mobile device 101 so that initiation of communication sessions with mobile device 101 to the user may be transferred to one or more other client devices 101, 109, 111 associated with the alternatively defined contact information, and the like. As such, portal interface 201 may determine (at step 505) whether at least one setting parameter requires or offers user customization. If customization is required or offered, then portal interface 103, per step 507, presents via, for example, user interface module 211, one or more setting parameter fields configured to receive customized input(s). In step 509, portal interface 103 receives one or more customized inputs via, for example, user interface module 211 and communication interface 205.

Accordingly, portal interface 103 may modify the one or more determined setting parameters based on the customized input(s), per step 511. For the sake of simplicity, reference to the setting parameter(s) may refer to the originally determined setting parameter(s) and/or the modified setting parameter(s). Thus, in step 513, portal interface 201 transmits the setting parameter(s) to account information storage facility 105 for storage to, for instance, setting parameters repository 113 and for requesting network registration platform 107 to remotely configure mobile device 101 based on the stored setting parameters. It is noted that portal interface 201 may transmit the setting parameter(s) to account information storage facility 105 in association with one or more unique identifiers or addressing information corresponding to mobile device 101, such as one or more directory numbers, electronic serial numbers, international mobile equipment identifiers, machine access control addresses, mobile directory numbers, mobile equipment identities, and the like.

Figure 6:
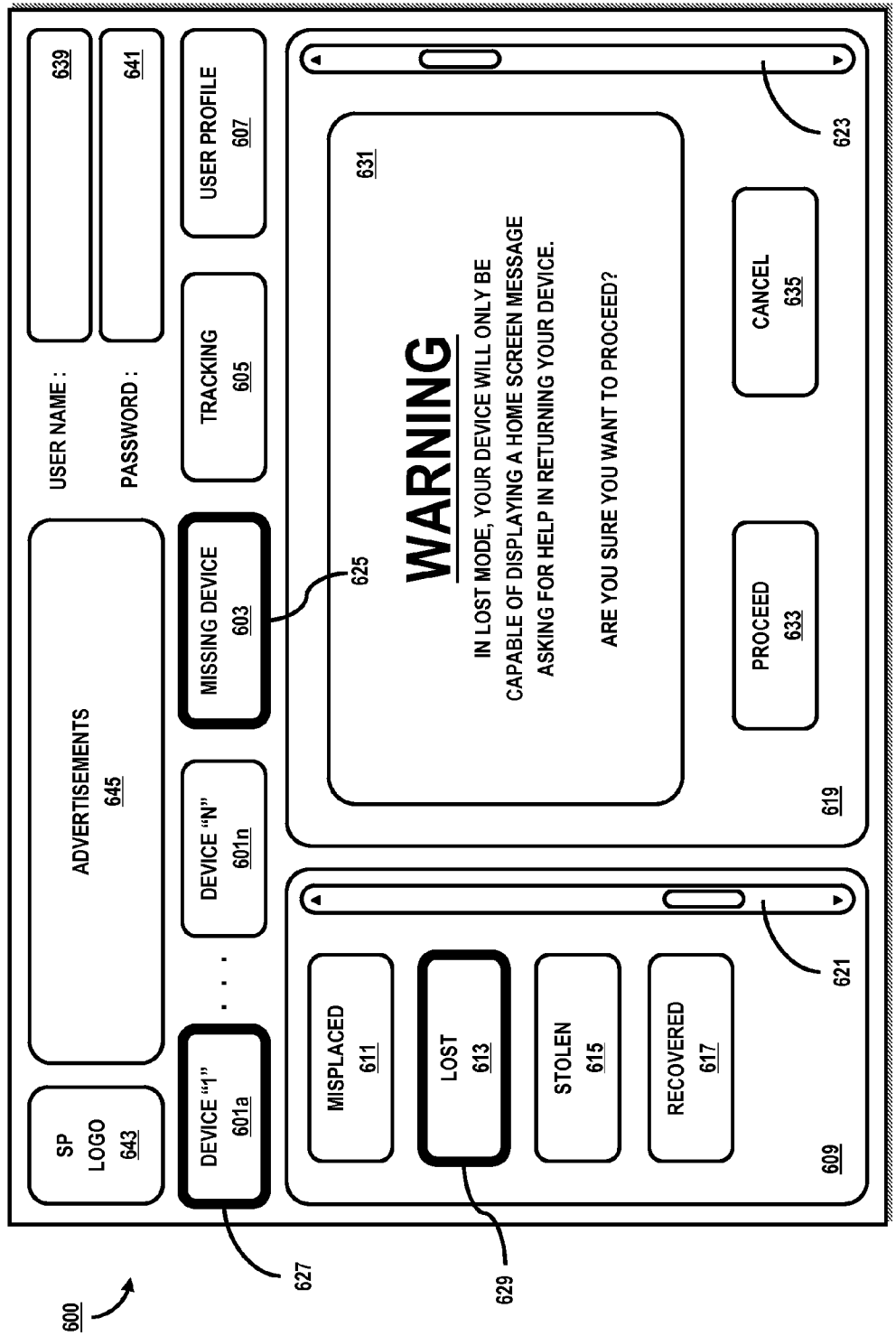
FIG. 6 is a graphical user interface (GUI) for designating a mobile device as missing, according to an exemplary embodiment.

FIG. 6 is a graphical user interface for designating a mobile device as missing, according to an exemplary embodiment. In this example, it is assumed that GUI 600 is provided to a user (or subscriber) of the remote configuration services of system 100 by portal interface 201 via, for instance, user interface module 211. It is also assumed that the subscriber is associated with one or more mobile devices, such as mobile device 101. Hence, GUI 600 includes a plurality of "tabs" (or interactive interface elements) 601a-601n corresponding to registered mobile devices 101 of (or associated with) the subscriber. A plurality of other tabs, e.g., "MISSING DEVICE" tab 603, "TRACKING" tab 605, and "USER PROFILE" tab 607 provide the subscriber with various functions. For instance, tab 603 enables the subscriber to provide an indication corresponding to a state of one or more of their associated mobile devices 101, such as one or more "missing" states, whereas tab 605 enables subscribers to request and/or receive spatial positioning information corresponding to a location of one or more of their associated mobile devices 101. Tab 607 enables subscribers to modify corresponding user profile information, such as to register new mobile devices 101 to the remote configuration services of system 100, update personal information, and the like.

Accordingly, selection of (or any other suitable interaction with) tab 603 toggles region 609 to an "active" state indication region 609, that enables the subscriber to specify (or otherwise indicate) a "missing" state for at least one of their associated mobile devices 101. In this respect, selection of (or other suitable interaction with) one or more of tabs 601a-601n causes state indications provided via state indication region 609 to govern the applicable state of corresponding mobile devices 101 associated with those ones of tabs 601a-601n that have been selected. To specify a mobile device state, state indication region 609 may include one or more selectable state identifiers (or other suitable interactive interface elements), such as "MISPLACED" state identifier 611, "LOST" state identifier 613, "STOLEN" state identifier 615, and "RECOVERED" state identifier 617. As such, interaction with a particular one of state identifiers 611-617 designates those mobile devices associated with tabs 601a-601n that have been selected as being in a state corresponding to the particularly selected state indicator. In other embodiments, state indication region 609 may include one or more navigation trees, expandable table of contents, or, for example, FlashMedia presentations of selectable state identifiers, as well as other equivalent listings, menus, options, etc., for providing indications of a "missing" state of mobile devices 101.

In exemplary embodiments, interaction with a particular one of state identifiers 611-617, toggles region 619 to an "active" remote configuration region 619 that describes one or more remote configurations that may be performed in association with the indicated state. In those instances when one or more setting parameters require or offer customization, region 619 may further provide one or more input fields, selectable entries, pull down menus, radio buttons, etc., to enable the user to provide customized inputs.

One or more navigational elements/fields, such as scrollbars 621 and 623, may be provided and configured to indicate the existence of additional information, entries, fields, buttons, menus, etc., not displayed, but navigably available, as well as facilitate interface usability. Accordingly, the subscriber may browse to additional information, entries, fields, etc., via, for instance, an input interface of a suitable client device (e.g., computing device 109), e.g., a cursor control. One or more fixed focus states (e.g., borders 625, 627, and 629) and/or distinctive magnification features, e.g., color, brightness, bolding, font type, text size, etc., may be used to convey the device(s) being designated as missing and to be remotely configured, as well as provide an indication of those features, functions, or states being "currently" employed.

As seen in FIG. 6, state indicator 613 has been interacted with, which is denoted by fixed focus state 629. Accordingly, remote configuration region 619 may be configured to provide one or more menus, options, instructions, buttons, etc., for effectuating or describing one or more setting parameters that are determined by portal interface 201 to correspond to state indicator 613 and potentially implemented if the designated state is applied. For instance, region 619 provides an instruction region 631 informing the subscriber of the potential implications of designating their mobile device as "lost." In this example, instruction region 631 provides a warning statement informing the subscriber that in lost mode, their mobile device will only be capable of displaying a home screen message asking for help in returning the device. It is noted, however, that other instructions, warnings, inputs, selections, etc., may be provided depending on those setting parameters determined by portal interface 201 to be imposed in association with the indication provided by way of state indication region 609. As such, interaction with interactive element 633 may be configured to carry out the described scenario, customized inputs, etc., whereas interaction with interactive element 635 may be configured to cancel the designation provided via state indication region 609. Corresponding instruction regions, interactive elements, input fields, pull down menus, etc., may be provided based on interaction with state indicators 611, 615, and 617.

According to additional exemplary embodiments, GUI 600 may include various other regions, such as a user name region 639 and a password region 641 for enabling subscribers to "log on" and obtain access to the features and functions of GUI 600. In alternative embodiments, regions 639 and 641 may be configured to correspond to other associated authentication information. It is noted that a "WELCOME, USERNAME" message may be presented to authenticated subscribers once sufficient authentication (or authorization) information is input to regions 639 and/or 641. Still further, GUI 600 may include a service provider logo region 643 to illustrate (or otherwise present) the subscriber with a logo of the service provider of the remote configuration services of system 100, as well as include other suitable (or equivalent) regions, such as advertisement region 645, etc.

Figure 7:
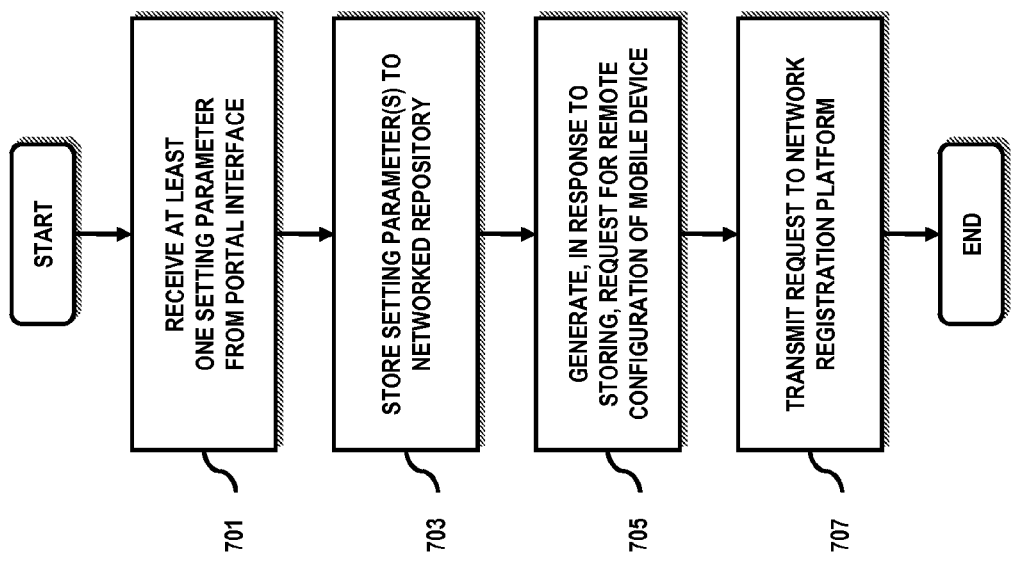
FIG. 7 is a flowchart of a process for requesting remote configuration of a mobile device designated as missing, according to an exemplary embodiment.

FIG. 7 is a flowchart of a process for requesting remote configuration of a mobile device designated as missing, according to an exemplary embodiment. For illustrative purposes, the process is described with respect to FIGS. 1 and 2. It is also noted that the process involves, for example, mobile device 101 having been designated as missing via, for instance, portal interface 201. Further, the steps of the process may be performed in any suitable order, as well as combined or separated in any suitable manner. At step 701, account information storage facility 241 receives via, for instance, communication interface 243, at least one setting parameter specifying at least one action to be performed by mobile device 101 that has been designated as being missing. In exemplary embodiments, the at least one setting parameter is received from portal interface 201 in association with, for example, one or more unique identifiers or addressing information corresponding to the mobile device 101, such as one or more directory numbers, electronic serial numbers, international mobile equipment identifiers, machine access control addresses, mobile directory numbers, mobile equipment identities, mobile identification numbers, internet protocol addresses, port addresses, and/or the like.

According to exemplary embodiments, account information storage facility 241 stores via, storage module 251 and/or communication interface 243, the at least one setting parameter to, for example, setting parameters repository 113, per step 703. It is noted that the at least one setting parameter may be, additionally (or alternatively), stored to any other suitable storage location or memory of (or accessible to) account information storage facility 241, such as memory 247. It is also noted that the at least one setting parameter may be stored to setting parameters repository 113 according to one or more structured models, such as according to a relational database model. For instance, the at least one setting parameter may be stored in association with one or more attributes of mobile device 101, such as in association with the unique identifier or address received from portal interface 103.

At step 705, account information storage facility 241 via, for instance, request module 249 generates a request for remote configuration of mobile device 101. It is noted that the generation of the request may be triggered in response to account information storage facility 241 storing the at least one setting parameter to setting parameters repository 113 or may be triggered in response to other indicia, such as account information storage facility 241 receiving the at least one setting parameter or based on one or more predefined policies of a service provider of the remote configuration services of system 100. According to exemplary embodiments, the request specifies the at least one setting parameter that, in turn, specifies one or more actions to be performed by mobile device 101. The request may also specify one or more of the attributes corresponding to mobile device 101, e.g., the unique identifier or address, and/or one or more location identifiers, e.g., URIs, URLs, etc., corresponding to where the at least one setting parameter may be retrieved for generation of at least one control message. Accordingly, the generated request may be transmitted via, for instance, request module 249 and/or communication interface 243, to network registration platform 281 via, for instance, service provider network 117, per step 707.

Figure 8:
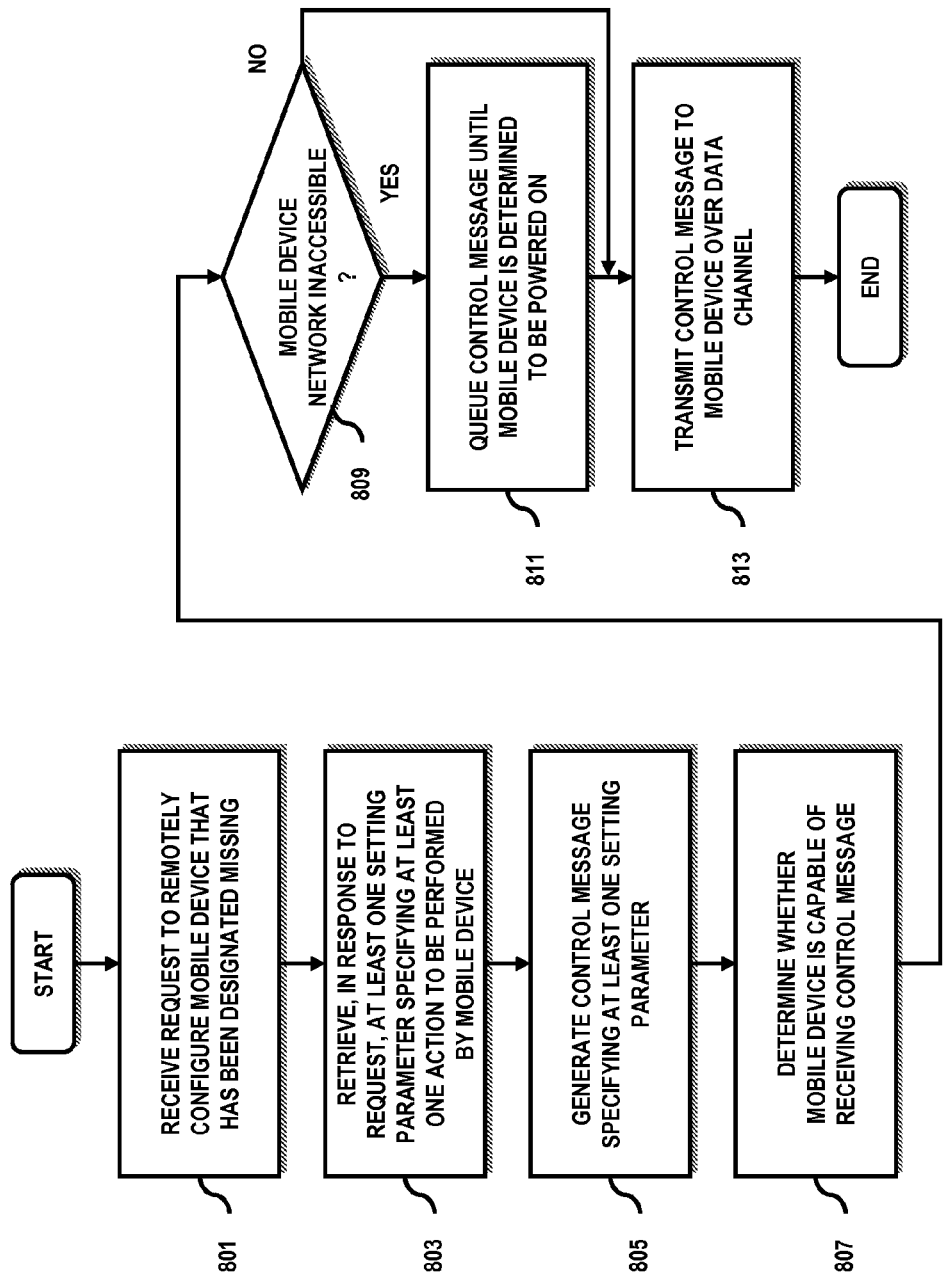
FIG. 8 is a flowchart of a process for transmitting a control message to a mobile device designated as missing, according to an exemplary embodiment.

FIG. 8 is a flowchart of a process for transmitting a control message to a mobile device designated as missing, according to an exemplary embodiment. For illustrative purposes, the process is described with respect to FIGS. 1 and 2. It is also noted that the process involves, for example, mobile device 101 having been indicated as being missing and account information storage facility 241 storing one or more setting parameters to, for instance, setting parameters repository 113. Further, the steps of the process may be performed in any suitable order, as well as combined or separated in any suitable manner. At step 801, network registration platform 281 receives via, for example, communication interface 283, a request from, for example, account information storage facility 241, to remotely configure mobile device 101 that has been designated as missing. In exemplary embodiments, the request may specify addressing information (e.g., directory number, electronic serial number, international mobile equipment identifier, machine access control address, mobile directory number, mobile equipment identity, mobile identification number, internet protocol address, port address, and/or any other suitable address) identifying mobile device 101 for remote configuration, as well as include one or more location identifiers, e.g., XRIs, IP addresses, HTTP addresses, URIs, URLs, etc., corresponding to one or more locations at which one or more setting parameters are stored and, thereby, may be retrieved for remotely configuring mobile device 101. In step 803, network registration platform 281 retrieves via, for example, query module 293 and the one or more location identifiers, the one or more setting parameters that, in exemplary embodiments, are stored to setting parameters repository 113. It is noted that the retrieved setting parameter(s) specify at least one action to be performed by mobile device 101, such as one or more actions to safeguard information stored to and prevent unauthorized use of mobile device 101 and/or one or more actions to facilitate locating and recovering mobile device 101.

Accordingly, query module 293 may port the retrieved setting parameters to control message generation module 285 to generate (per step 805) one or more control messages to remotely configure mobile device 101. It is noted that the control message(s) specify the retrieved setting parameter(s). Further, it is noted that the messages may be generated for implementation via one or more programmable interfaces 127 of mobile device 101 and, as such, may be directed to programmable interface(s) 127 via one or more BREW-directed or other suitable type of directed control messages. In step 807, network registration platform 281 may determine whether mobile device 101 is capable of receiving the generated control message(s) via, for instance, presence service module 291. For example, network registration platform 281 may determine whether mobile device 101 is network accessible, as in step 809. Additionally or alternatively, network registration platform 281 may utilize other presence information associated with mobile device 101, such as receiving signal strength, spatial positioning information, etc., to determine the capability (or availability) of mobile device 101 to receive control message(s). If mobile device 101 is not capable of receiving control messages, e.g., mobile device 101 is determined to be powered off (network inaccessible), network registration platform 281 via, for example, queue module 295 queues (in step 811) the control message(s) until mobile device 101 is determined to be capable of receiving the generated control message(s), e.g., until mobile device 101 is determined to be powered on and/or otherwise available to receive the control messages. Accordingly, if and when mobile device 101 is determined to be capable of receiving the generated control messages(s), e.g., when mobile device 101 is determined to be network accessible (e.g., powered on), network registration platform 107 via, for example, communication interface 283 transmits the generated control message(s) to mobile device 101 (as in step 813) over, for example, a data channel of one or more of networks 115-117, such as an existing access and control data channel of wireless network 121 conventionally utilized by a service provider of system 100 to distribute software updates to corresponding mobile devices 101.

Figure 9:
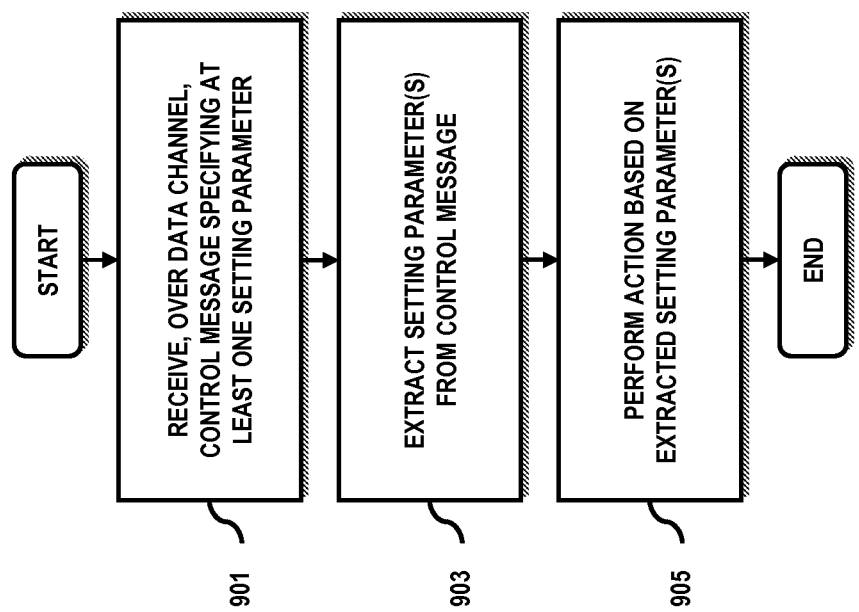
FIG. 9 is a flowchart of a process for performing at least one action specified in a control message, according to an exemplary embodiment.

FIG. 9 is a flowchart of a process for performing at least one action specified in a control message, according to an exemplary embodiment. For illustrative purposes, the process is described with reference to FIGS. 1 and 3. It is also noted that the process involves, for example, mobile device 300 having been indicated as being missing and determined by, for example, network registration platform 107 as being available to receive one or more control messages. Further, the steps of the process may be performed in any suitable order, as well as combined or separated in any suitable manner. At step 901, mobile device 300 (via, for instance, transceiver 327) receives one or more control messages over a data channel of, for example, wireless network 121. The one or more control messages may specify one or more setting parameters that, in turn, specify one or more actions to be performed by mobile device 300, such as one or more actions to "lock" the device to prevent data disclosure, enable one or more communication limitations (e.g., limiting voice and messaging communications to certain designated directory addresses, disabling data communications, etc.) to prevent unauthorized use of the device, image (or backup) a memory of the device and upload the image to a corresponding user profile associated with the device to prevent complete loss of information stored to the device 300, format (or erase) a memory of the device to purge the device of personal or otherwise sensitive information, and/or one or more other similar or suitable actions to safeguard information stored to and prevent unauthorized use of the device. For example, the actions may cause mobile device 300 to configure a presentation of display 307 to present a message asking for help in returning the device to its rightful owner and that by initiating a communication session, e.g., by pressing a "SEND" button of, for instance, keypad 309, a reader of the message may initiate communications with the rightful owner. In other instances, the one or more actions may remotely configure one or more audio, visual, and/or tactile alerts of mobile device 300 for presentation to bring attention to the device, or may "brick" mobile device 300 to prevent subsequent use of the device. The data channel may be an existing control and access data channel conventionally utilized by a service provider to distribute software updates to corresponding mobile devices 300. Accordingly, transceiver 333 may port received control messages to messaging module 325 and/or controller 317 to identify the control messages as control messages and extracting (or otherwise parsing) the one or more setting parameters from the one or more control messages, per step 903. At step 905, programmable interfaces 303a-303n (or other suitable component of mobile device 300) performs the one or more specified actions based on the extracted setting parameter(s). For example, controller 317 may implement (or otherwise apply) the one or more setting parameters to the one or more programmable interfaces 303a-303n and, as such, the one or more programmable interfaces 303a-303n may perform or otherwise execute the specified action(s).

The processes described herein for providing remote configuration services for missing mobile devices may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
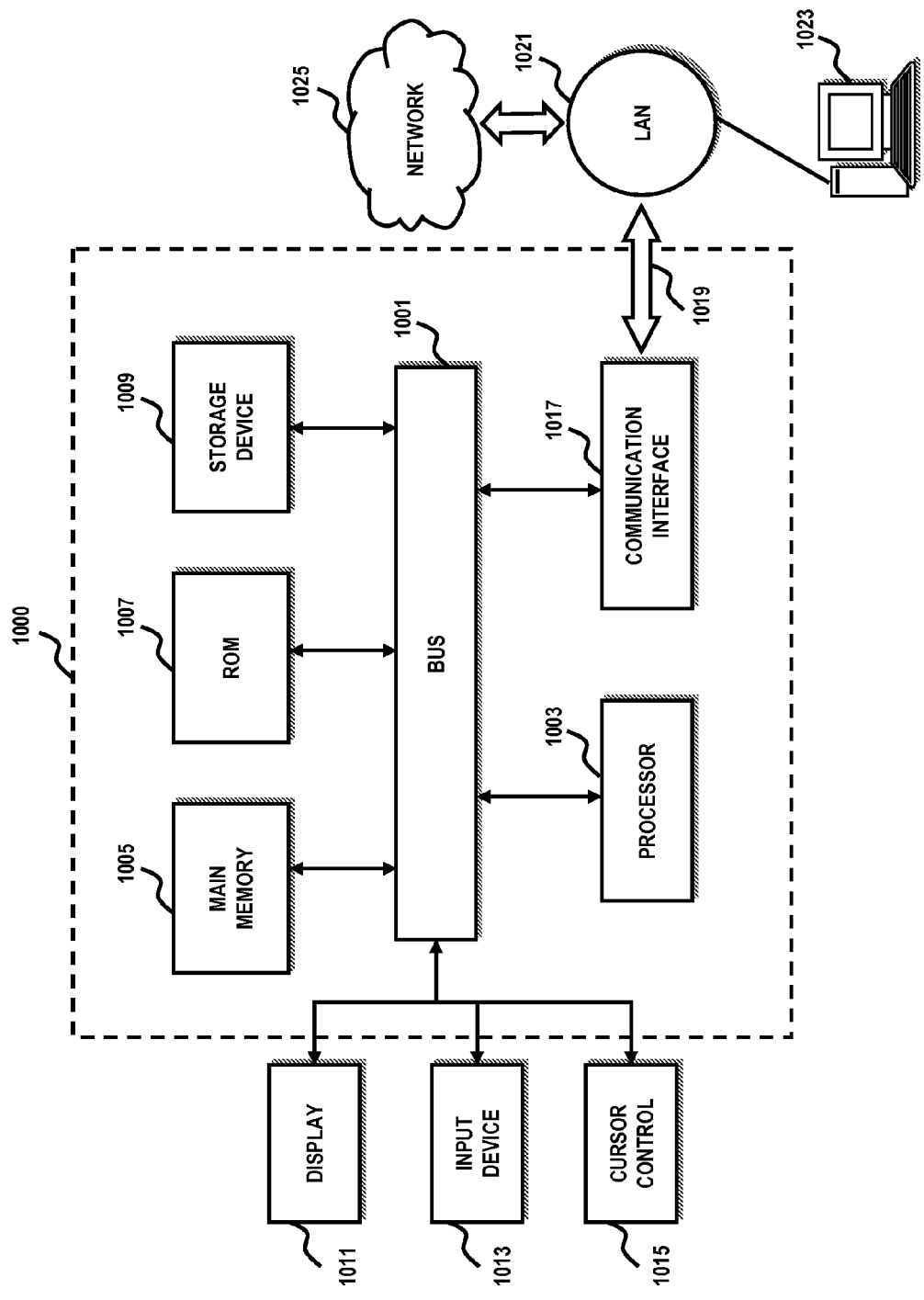
FIG. 10 is a diagram of a computer system that can be used to implement various exemplary embodiments.

FIG. 10 illustrates computing hardware (e.g., computer system) 1000 upon which exemplary embodiments can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving by a remote configuration service platform a request to remotely configure a mobile device that has been designated to be in one or more of a plurality of missing states;
   retrieving, in response to the request, at least one setting parameter specifying at least one action to be performed by the mobile device;
   generating a control message specifying the at least one setting parameter;
   determining whether the mobile device is network inaccessible; and
   queuing the control message for transmission over a data channel to the mobile device when the mobile device is determined to be network inaccessible,
   wherein the at least one setting parameter is stored for retrieval to a networked repository by the remote configuration service platform and is based on a policy of the remote configuration service platform to be effectuated in dependence on the one or more of the plurality of missing states the mobile device has been designated to be in,
   wherein the plurality of missing states that the mobile device can be designated to be in include misplaced, lost, and stolen,
   wherein, when the control message queued for transmission to the mobile device is not transmitted to the mobile device, the control message is removed from the queue after a predetermined time,
   wherein the policy of the remote configuration service platform specifies actions to be performed by the mobile device that are different for each of the designations misplaced, lost, or stolen, and
   wherein the actions specified to be performed for the misplaced designation consist of causing the mobile device to emit an audio and tactile alert, the actions specified to be performed for the lost designation consist of designating an alternate contact information for an owner/use of the mobile device so that initiation of communication sessions with the mobile device to the owner/user is transferred to one or more other client devices, and the actions specified to be performed for the stolen designation consist of causing the mobile device to image and format the memory, and then disable the mobile device.

2. A method according to claim 1, wherein the mobile device has been designated missing via a portal interface.

3. A method according to claim 1, wherein the request is received from an account information storage facility.

4. A method according to claim 1, wherein the control message is further generated to include a request for spatial positioning information corresponding to a location of the mobile device.

5. A method according to claim 1, further comprising:
   transmitting, over the data channel, the control message to the mobile device when the mobile device is determined to be powered on.

6. A method according to claim 5, wherein the data channel is an existing control and access data channel of a wireless network.

7. An apparatus comprising:
   at least one processor; and
   at least one memory including computer program code, the at least one memory and the computer program code being configured, with the at least one processor, to cause the apparatus at least to,
   receive by a remote configuration service platform a request to remotely configure a mobile device that has been designated to be in one or more of a plurality of missing states,
   retrieve, in response to the request, at least one setting parameter specifying at least one action to be performed by the mobile device,
   generate a control message specifying the at least one setting parameter,
   determine whether the mobile device is network inaccessible, and
   queue the control message for transmission over a data channel to the mobile device when the mobile device is determined to be network inaccessible,
   wherein the at least one setting parameter is stored for retrieval to a networked repository by the remote configuration service platform and is based on a policy of the remote configuration service platform to be effectuated in dependence on the one or more of the plurality of missing states of the mobile device has been designated to be in, wherein the plurality of missing states that the mobile device can be designated to be in include misplaced, lost, and stolen, wherein, when the control message queued for transmission to the mobile device is not transmitted to the mobile device, the control message is removed from the queue after a predetermined time, wherein the policy of the remote configuration service platform specifies actions to be performed by the mobile device that are different for each of the designations misplaced, lost, or stolen, and wherein the actions specified to be performed for the misplaced designation consist of causing the mobile device to emit an audio and tactile alert, the actions specified to be performed for the lost designation consist of designating an alternate contact information for an owner/use of the mobile device so that initiation of communication sessions with the mobile device to the owner/user is transferred to one or more other client devices, and the actions specified to be performed for the stolen designation consist of causing the mobile device to image and format the memory, and then disable the mobile device.

8. An apparatus according to claim 7, wherein the mobile device has been designated missing via a portal interface.

9. An apparatus according to claim 7, wherein the request is received from an account information storage facility.

10. An apparatus according to claim 7, wherein the control message is further generated to include a request for spatial positioning information corresponding to a location of the mobile device.

11. An apparatus according to claim 7, wherein the apparatus is at least further caused to:
transmit, over the data channel, the control message to the mobile device when the mobile device is determined to be powered on.

12. An apparatus according to claim 11, wherein the data channel is an existing control and access data channel of a wireless network.

13. An apparatus according to claim 7, wherein the apparatus is a network registration platform.

14. A non-transitory computer-readable storage medium carrying one or more sequences of one or more instructions which, when executed by one or more processors, cause a system, comprising a remote configuration service platform and a database coupled to the remote configuration service platform, to at least perform the following steps:
receiving by the remote configuration service platform a request to remotely configure a mobile device that has been designated to be in one or more of a plurality of missing states; and
storing in the database at least one setting parameter specifying at least one action to be performed by the mobile device, wherein the step of receiving includes, in response to the request, generating a control message specifying the at least one setting parameter, to determine whether the mobile device is network inaccessible, and to queue the control message for transmission over a data channel to the mobile device when the mobile device is determined to be network inaccessible, wherein the at least one setting parameter is stored for retrieval to a networked repository by the remote configuration service platform and is based on a policy of the remote configuration service platform to be effectuated in dependence on the one or more of the plurality of missing states the mobile device has been designated to be in, wherein the plurality of missing states that the mobile device can be designated to be in include misplaced, lost, and stolen, wherein, when the control message queued for transmission to the mobile device is not transmitted to the mobile device, the control message is removed from the queue after a predetermined time, wherein the policy of the remote configuration service platform specifies actions to be performed by the mobile device that are different for each of the designations misplaced, lost, or stolen, and wherein the actions specified to be performed for the misplaced designation consist of causing the mobile device to emit an audio and tactile alert, the actions specified to be performed for the lost designation consist of designating an alternate contact information for an owner/use of the mobile device so that initiation of communication sessions with the mobile device to the owner/user is transferred to one or more other client devices, and the actions specified to be performed for the stolen designation consist of causing the mobile device to image and format the memory, and then disable the mobile device.

15. A non-transitory computer-readable storage medium according to claim 14, wherein the mobile device has been designated missing via a portal interface.

16. A non-transitory computer-readable storage medium according to claim 14, wherein the request is received from an account information storage facility.

17. A non-transitory computer-readable storage medium according to claim 14, wherein the control message is further generated to include a request for spatial positioning information corresponding to a location of the mobile device.

18. A non-transitory computer-readable storage medium according to claim 14, wherein the system is further caused to perform:
transmitting, over the data channel, the control message to the mobile device when the mobile device is determined to be powered on.

19. A non-transitory computer-readable storage medium according to claim 18, wherein the data channel is an existing control and access data channel of a wireless network.

* * * * *